Figure 1:
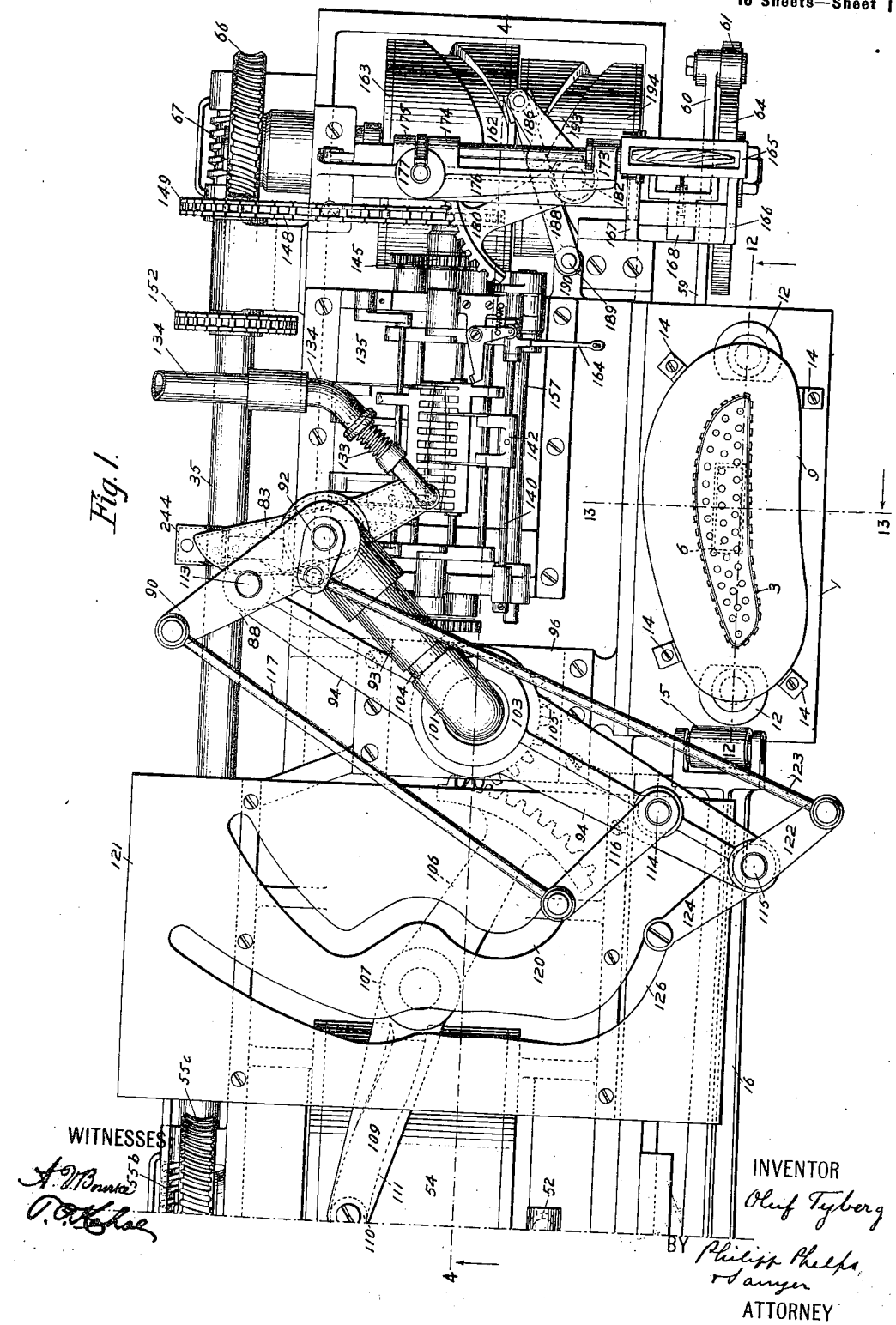

No. 654,203.  
O. TYBERG.  
CIGAR MACHINE.  
(Application filed Feb. 5, 1900.)  
Patented July 24, 1900.

(No Model.) 10 Sheets—Sheet 1.

WITNESSES  
INVENTOR  
Oluf Tyberg  
BY Philipp Phelps  
Sanger  
ATTORNEY

No. 654,203. Patented July 24, 1900.
O. TYBERG.
CIGAR MACHINE.
(Application filed Feb. 5, 1900.)
(No Model.)
10 Sheets—Sheet 2.
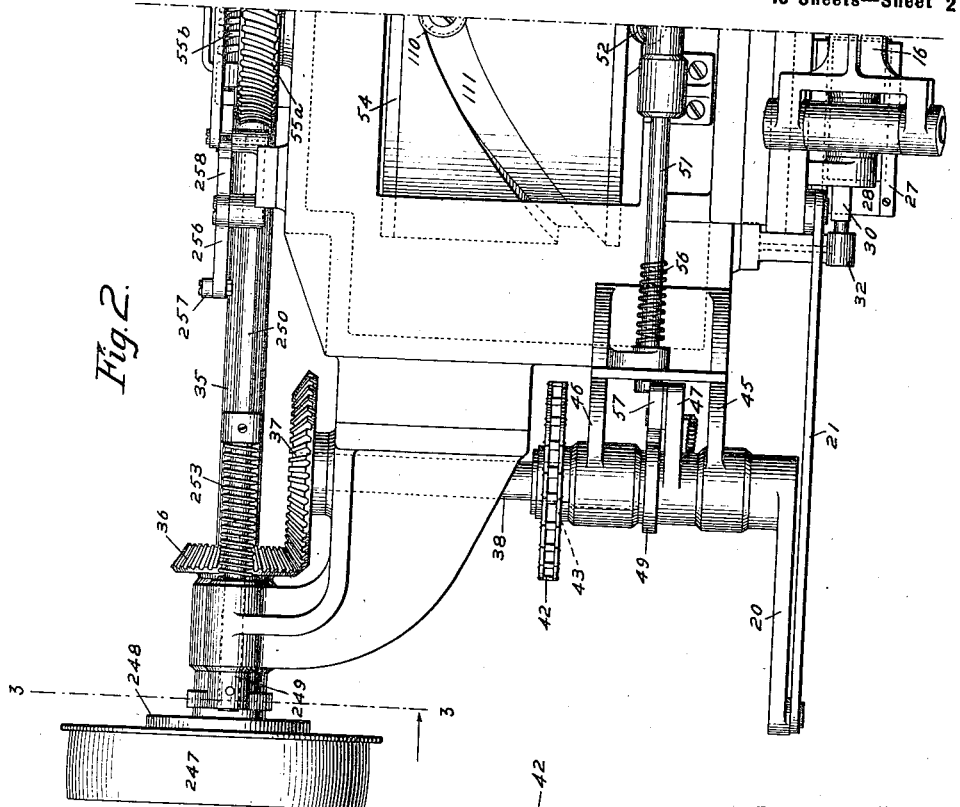
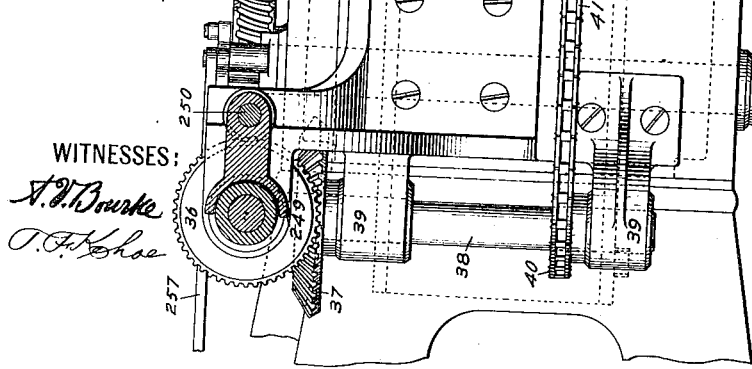
WITNESSES:
INVENTOR
Oluf Tyberg
BY
Philip Phelps Sawyer
ATTORNEY

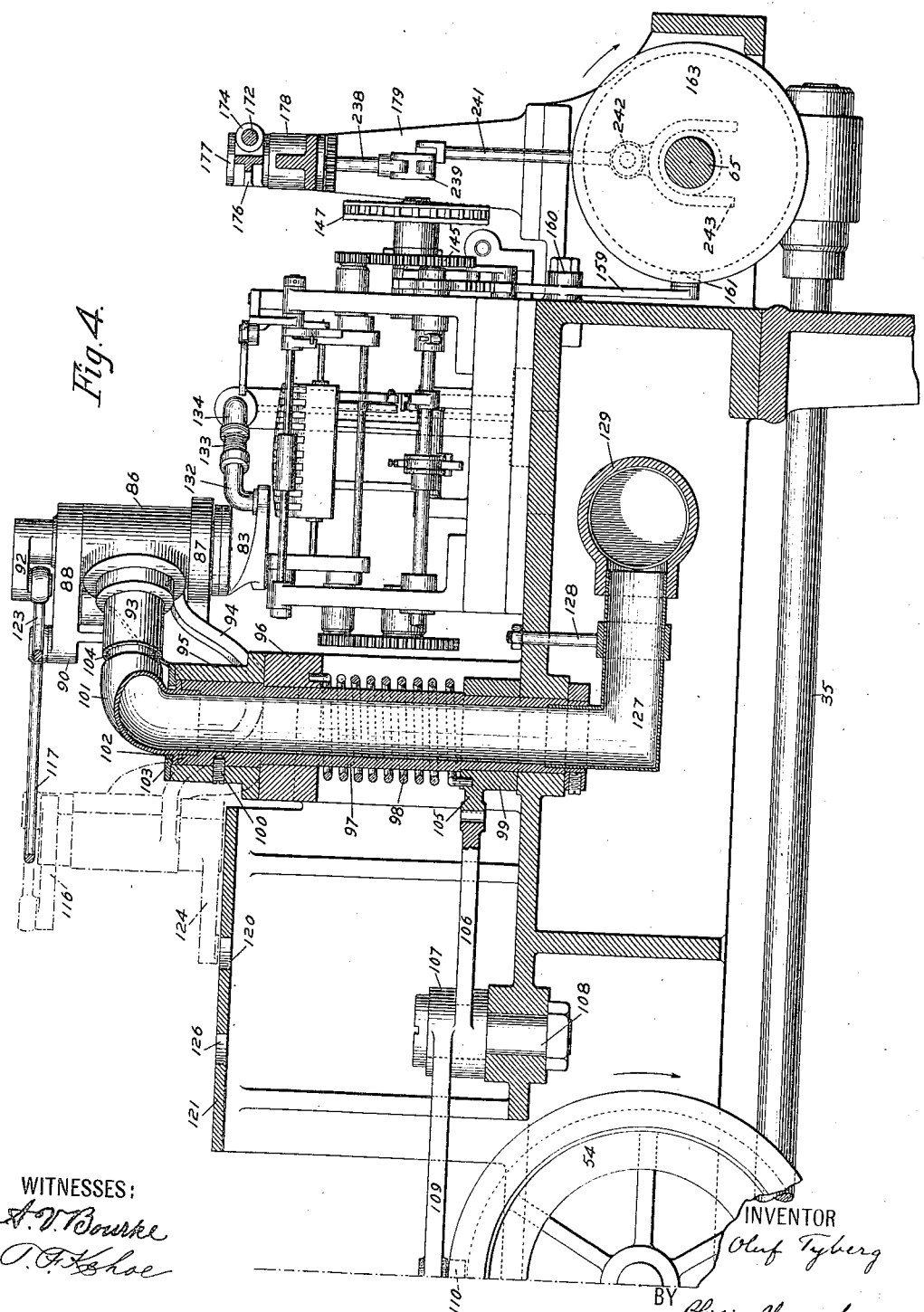

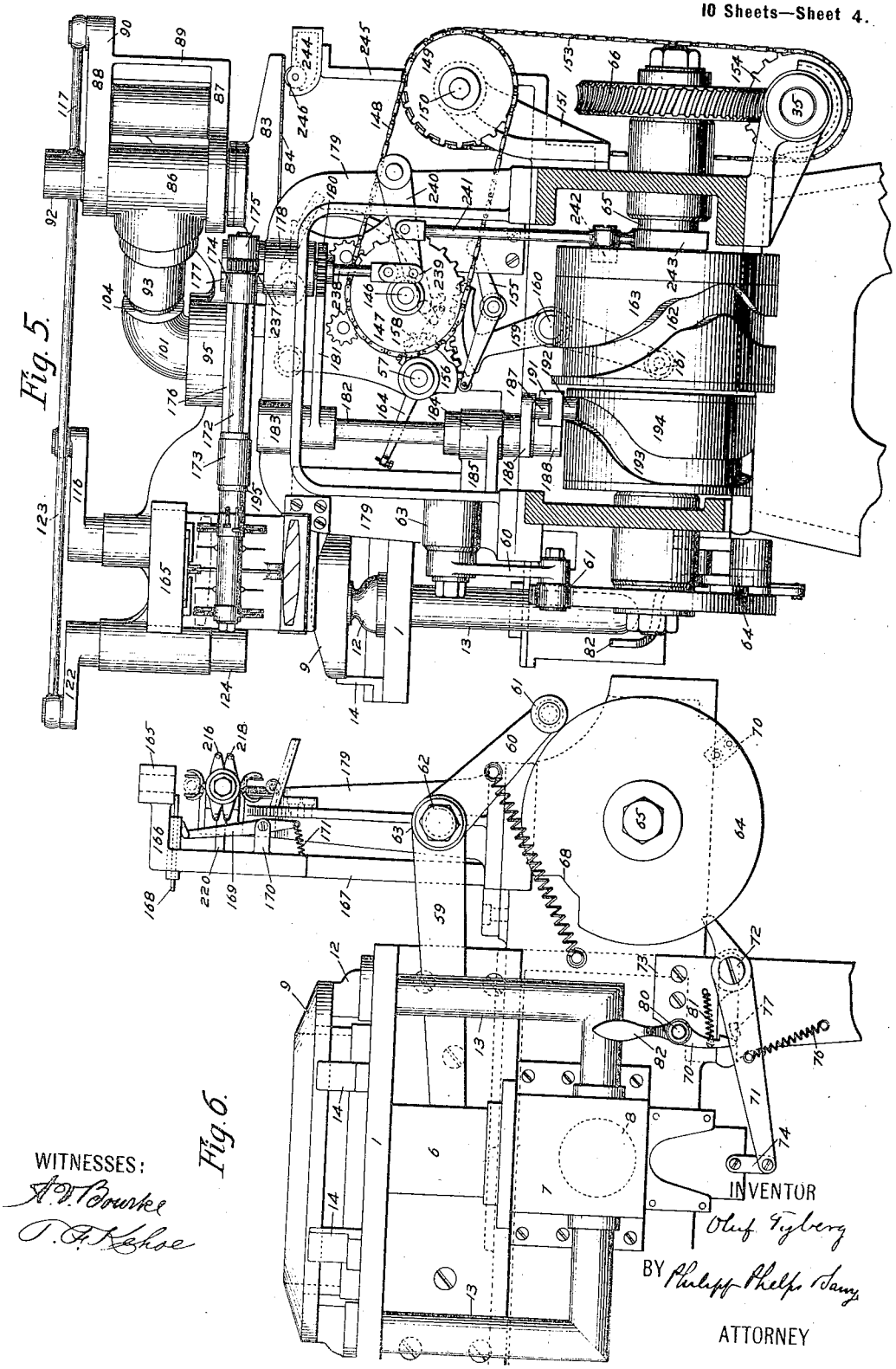

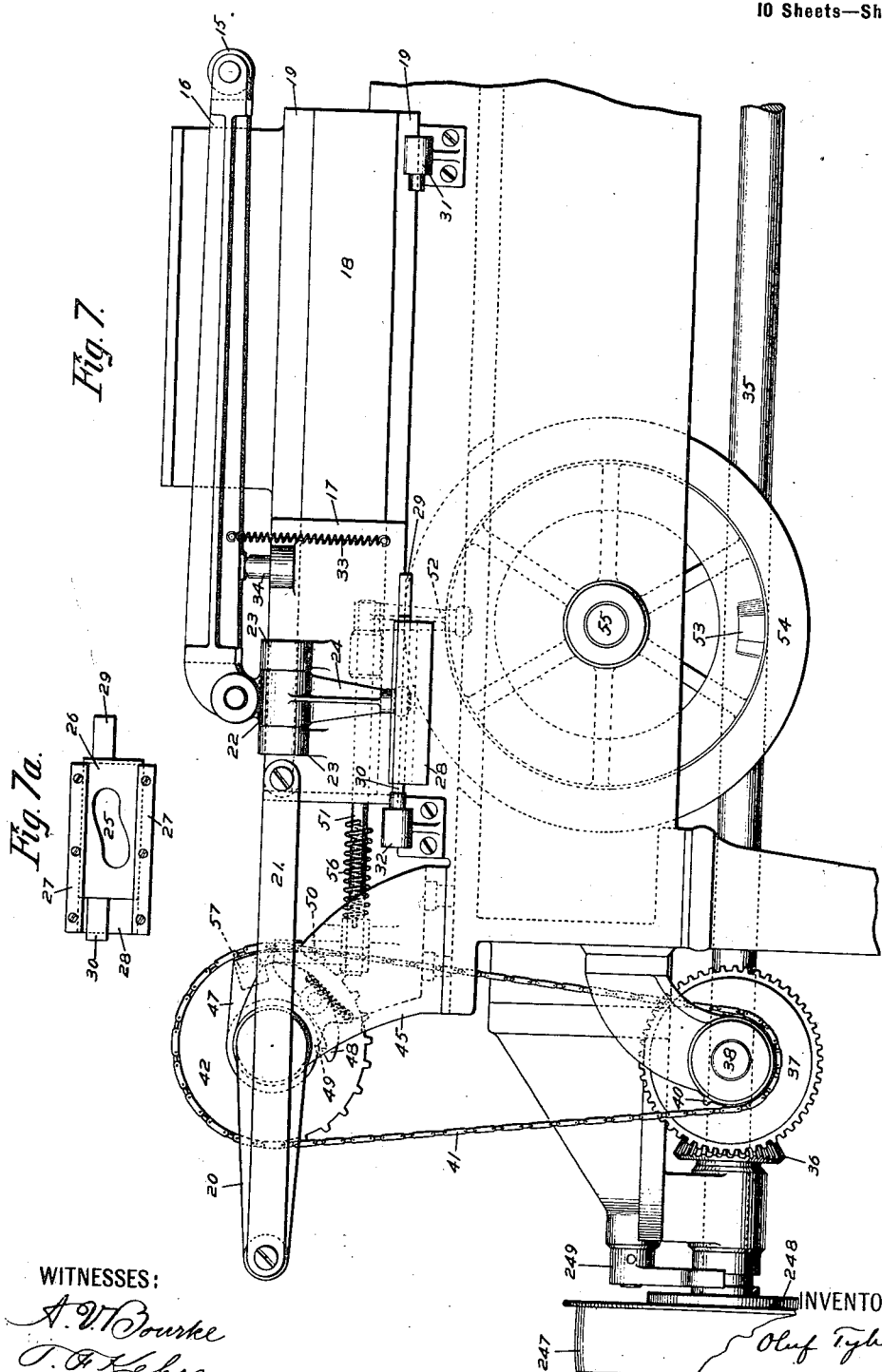

No. 654,203. Patented July 24, 1900.
O. TYBERG.
CIGAR MACHINE.
(Application filed Feb. 5, 1900.)
(No Model.) 10 Sheets—Sheet 6.

WITNESSES:
A. V. Bourke
J. F. Kehoe

INVENTOR
Oluf Tyberg
BY
Philipp Phelps Sauge
ATTORNEY

No. 654,203.
O. TYBERG.
CIGAR MACHINE.
(Application filed Feb. 5, 1900.)
Patented July 24, 1900.
(No Model.)
10 Sheets—Sheet 7.
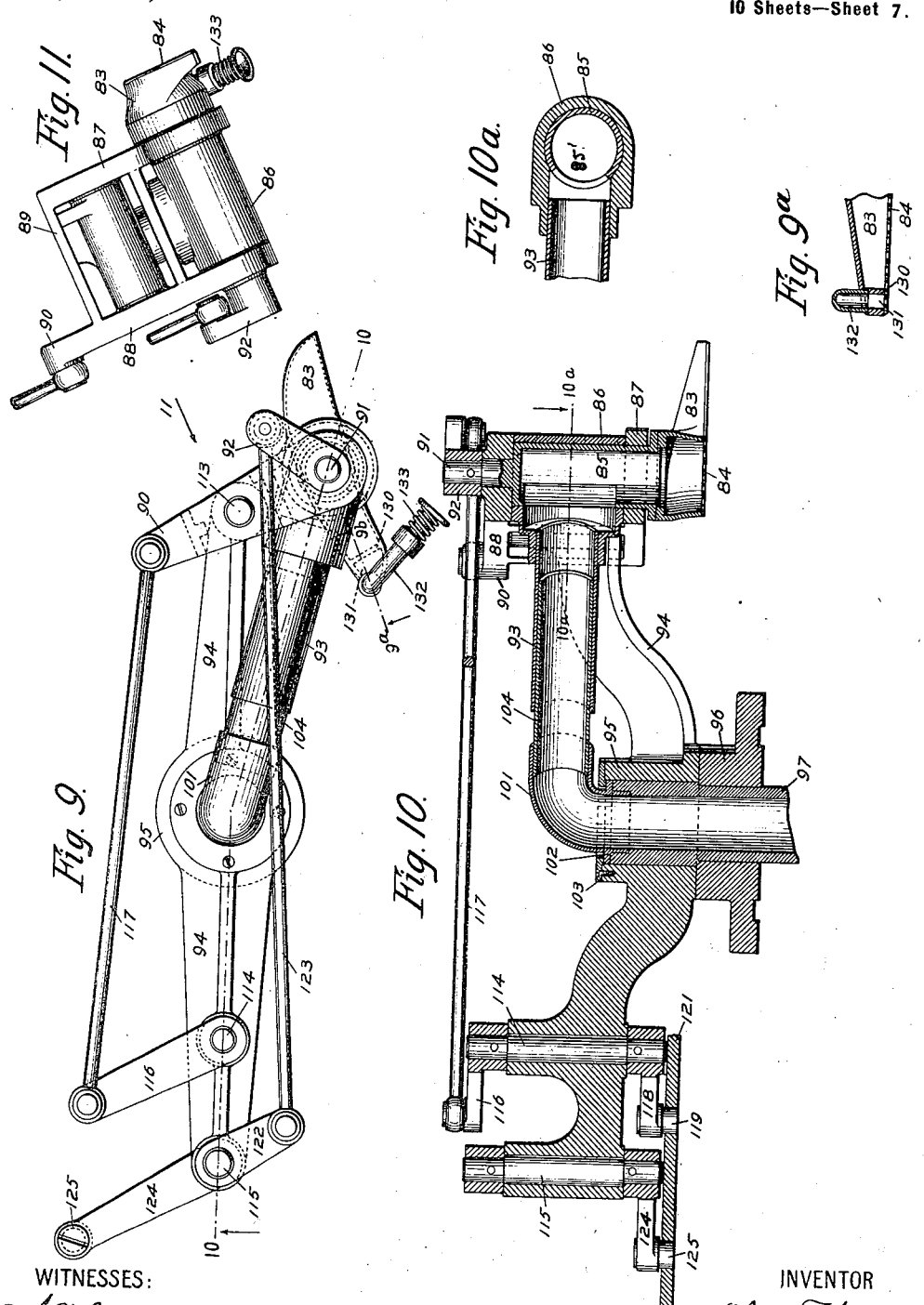
WITNESSES:
INVENTOR
Oluf Tyberg
BY
ATTORNEY No. 654,203. Patented July 24, 1900.
O. TYBERG.
CIGAR MACHINE.
(Application filed Feb. 5, 1900.)
(No Model.) 10 Sheets—Sheet 8.
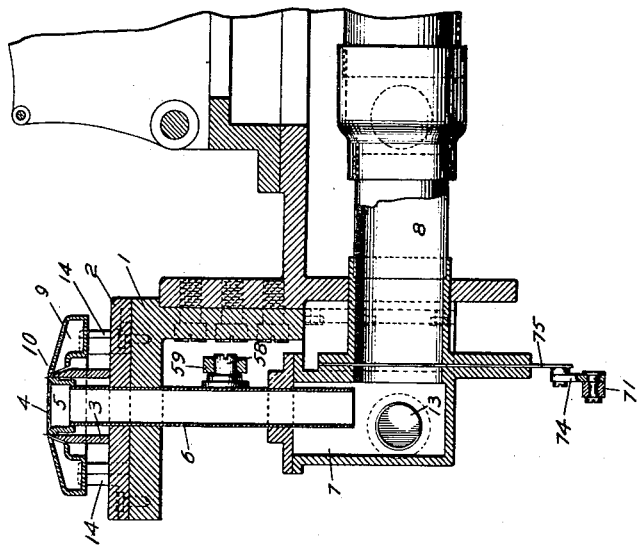
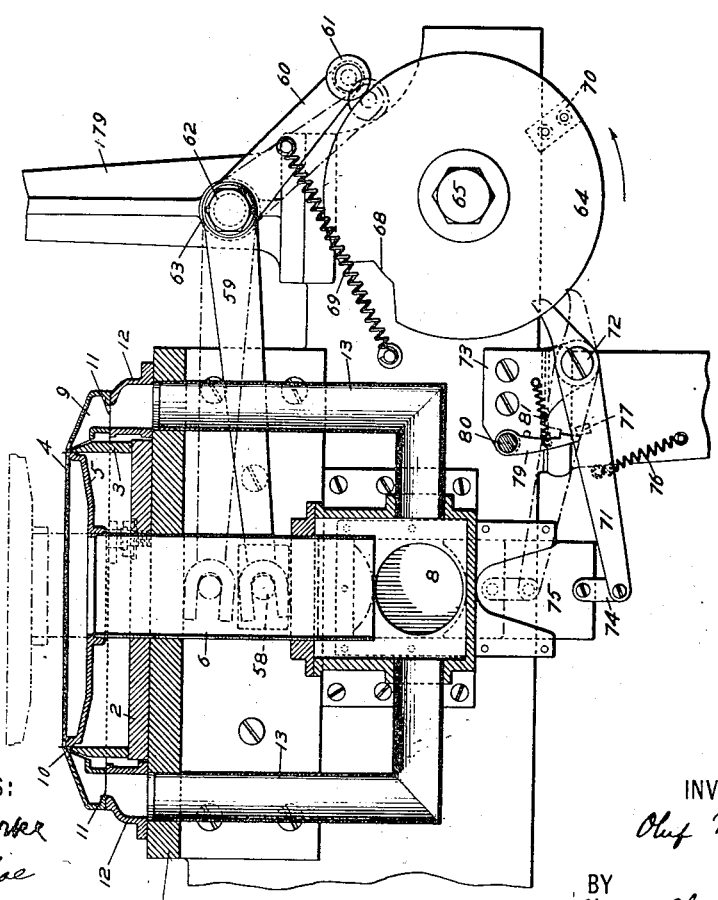
WITNESSES:
INVENTOR
BY
ATTORNEY No. 654,203. Patented July 24, 1900.
O. TYBERG.
CIGAR MACHINE.
(Application filed Feb. 5, 1900.)
(No Model.) 10 Sheets—Sheet 9.
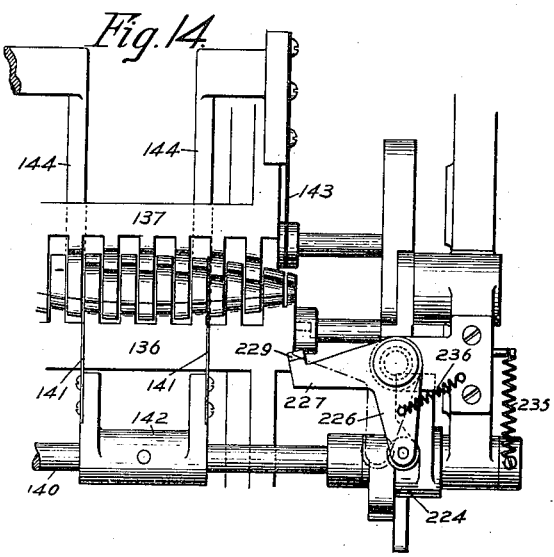
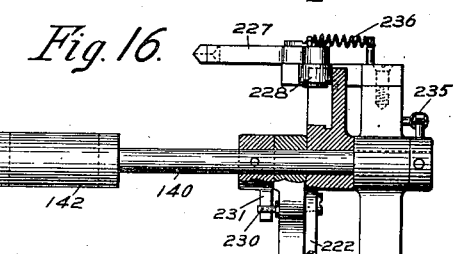
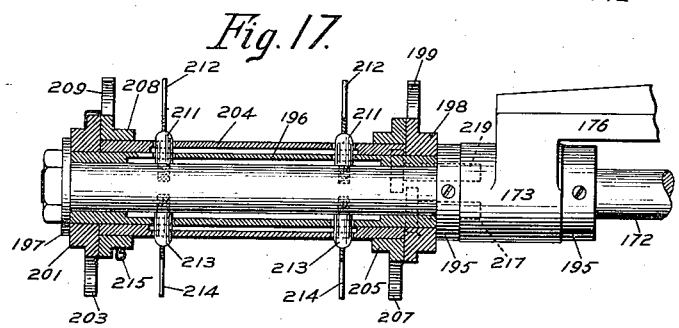
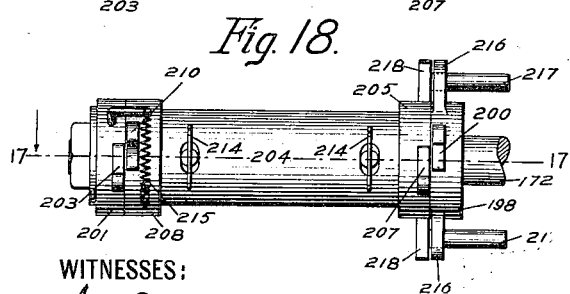
WITNESSES:
INVENTOR
BY
ATTORNEY

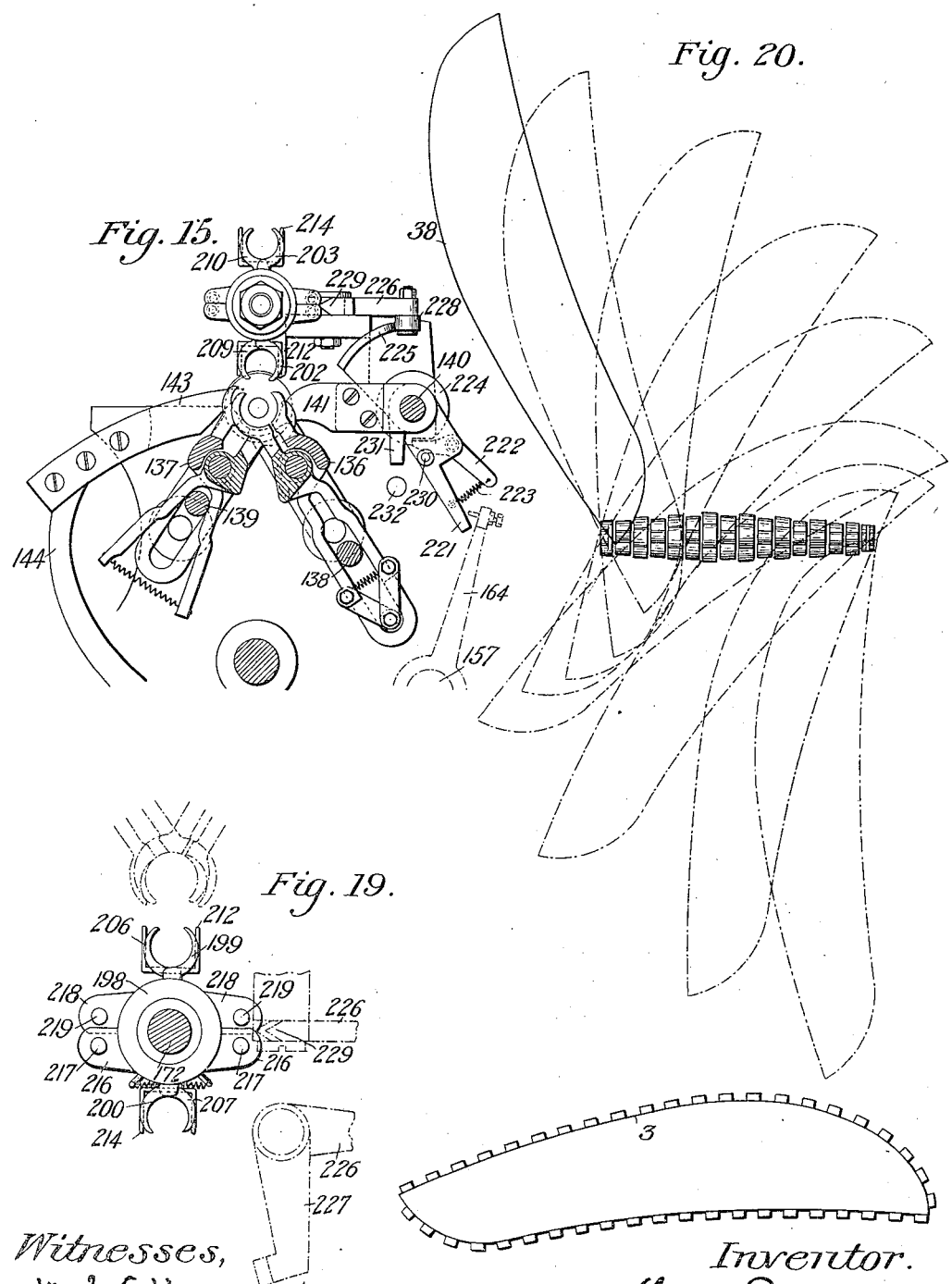

UNITED STATES PATENT OFFICE.

OLUF TYBERG, OF NEW YORK, N. Y., ASSIGNOR TO RUFUS L. PATTERSON AND GEORGE ARENTS, JR., OF SAME PLACE.

CIGAR-MACHINE.

SPECIFICATION forming part of Letters Patent No. 654,203, dated July 24, 1900.

Application filed February 5, 1900. Serial No. 4,081. (No model.)

*To all whom it may concern:*

Be it known that I, OLUF TYBERG, a citizen of the United States, residing at New York, county of New York, and State of New York, have invented certain new and useful Improvements in Cigar-Machines, fully described and represented in the following specification and the accompanying drawings, forming a part of the same.

This invention relates generally to certain improvements in cigar-machines.

One of the objects of this invention is to produce an improved mechanism for cutting a cigar-wrapper from a leaf.

A further object of the invention is to produce an improved mechanism for transferring a cut wrapper from a cutting-bed or any other suitable source of supply to a wrapping mechanism and to present said wrapper properly to the cigar-bunch in the wrapping mechanism, so that the wrapper may be evenly and smoothly wrapped upon the bunch.

A further object of the invention is to produce an improved mechanism which shall operate to remove the completed cigar from the wrapper or rolling mechanism.

A further object of the invention is to produce an improved mechanism for automatically feeding the cigar-bunches to the wrapping or rolling mechanism.

A further object of the invention is to produce an improved means for automatically gumming the tip end of the wrapper.

With these and other objects in view the invention consists in certain constructions and in certain parts, improvements, and combinations, as will be hereinafter described, and more fully pointed out in the claims hereunto appended.

Figure 8:
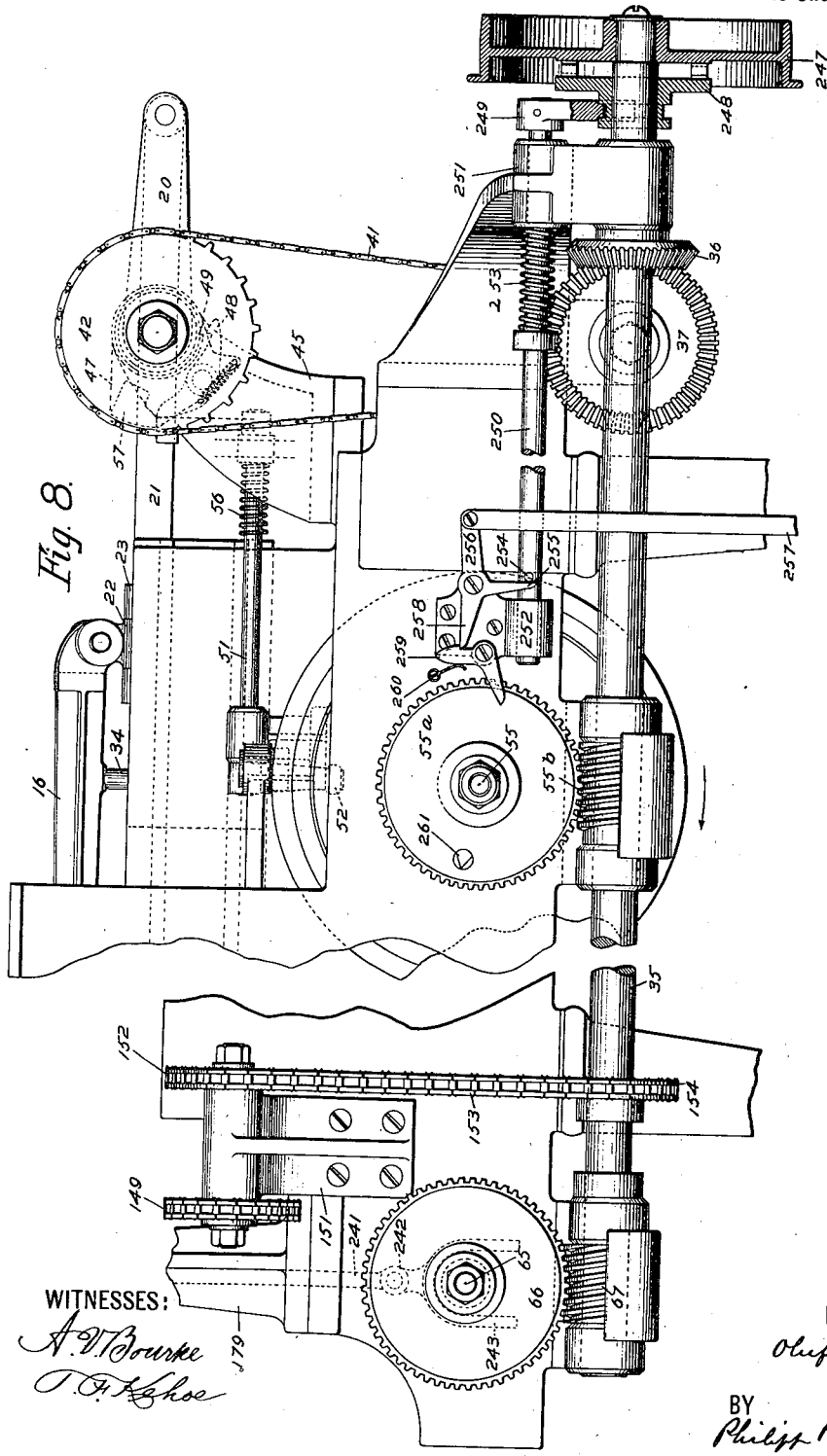

In the accompanying drawings, which form a part of this specification, and in which like characters of reference indicate the same parts, Figure 1 is a plan view of the right-hand end of the machine, showing the principal operating parts. Fig. 2 is a plan view of the left-hand end of the machine, showing the devices for driving the parts shown in Fig. 1. Fig. 3 is an elevation, partly in section, the plane of section being indicated by the line 3 3 of Fig. 2. Fig. 4 is a vertical section on the line 4 4 of Fig. 1. Fig. 5 is an elevation looking toward the right-hand end of the machine as is seen by the observer in Fig. 1. Fig. 6 is a front elevation of the right-hand end of the machine. Fig. 7 is a front elevation of the left-hand end of the machine. Fig. 7$^a$ is a detail view of one of the cams. Fig. 8 is a rear elevation of the machine, the central portion being broken away. Fig. 9 is a detail plan view of the wrapper-transferring mechanism. Fig. 9$^a$ is a section of part of the wrapper-support on the line 9$^a$ 9$^a$ of Fig. 9. Fig. 10 is a section on the line 10 10 of Fig. 9. Fig. 10$^a$ is a detail section on the line 10$^a$ of Fig. 10. Fig. 11 is an end view of the construction shown in Fig. 9 looking in the direction of the arrow 11 in that figure. Fig. 12 is a section on the line 12 12 of Fig. 1. Fig. 13 is a section on the line 13 13 of Fig. 1. Fig. 14 is a plan view of the wrapping mechanism and some of the parts immediately connected therewith. Fig. 15 is an end view, partly in section, of the construction shown in Fig. 14 and also showing the bunch-holder in position over the wrapping mechanism. Fig. 16 is a detail elevation of part of the operating mechanism for the construction shown in Fig. 14. Figs. 17 and 18 are respectively a section and an elevation of the bunch-holder. Fig. 19 is an end elevation, partly in section, of the bunch-holder. Fig. 20 is a diagrammatic view showing the relative positions of the wrapper-die, the wrapping mechanism, and some of the various positions assumed by the wrapper-transferring mechanism in delivering the wrapper to the wrapping mechanism.

In the general operation of the specific machine which has been selected to illustrate the invention a wrapper is first cut from a leaf of tobacco. After the wrapper has been cut a portion of the cutting-bed rises and delivers the cut wrapper to a transferring mechanism, which transferring mechanism includes a support by which the wrapper is held, preferably by suction. The transferring mechanism moves from the cutting-bed into a position where the tip of the wrapper, which then depends from the support, can be seized by a wrapping mechanism, into which a bunch has been deposited by an automatic bunch-feeding mechanism. After the bunch has been wrapped it is removed from the wrapping mechanism and a fresh bunch placed therein, when the operations before described are repeated.

The cutting mechanism will first be described, reference being had particularly to Figs. 1, 6, 7, 7ª, 12, and 13, which more particularly illustrate the construction of this part of the machine.

Referring to Figs. 12 and 13, 1 indicates a support, which may be of any suitable form, but is preferably, as shown, in the form of a bracket suitably secured, as by screws, to the frame of the machine. This bracket supports a bed-plate 2, upon which rests a knife 3. The knife may be of any suitable construction and of any suitable shape, according to the material to be cut and the configuration which it is desired to give it. Preferably, however, when a cigar-wrapper is to be cut it will be shaped as shown in Fig. 1—that is, it will be given a general elliptical form, this form being, however, varied from a true ellipse in order to produce a wrapper of a shape which can readily be manipulated by the wrapping mechanism to be smoothly wrapped upon the bunch.

It is desirable that the tobacco-leaf from which the wrapper is to be cut should be thoroughly stretched before cutting and be held stretched after the cutting operation. While this may be effected in various ways, it will preferably be accomplished by forming that portion of the cutting-bed which lies within the perimeter of the knife of a perforated plate, as 4, said plate covering a chamber the bottom and side of which are formed in any suitable manner, as by a casting 5. This casting has a perforation in its bottom, and to this perforation is connected a pipe 6, said pipe communicating with an air-box 7, which air-box is connected to any suitable form of suction mechanism in any suitable manner, as by a pipe 8.

In order to make sure that the cut portion of the wrapper is cleanly separated by the operation of the cutting mechanism from the remainder of the leaf and to assist in the stretching operation, it is desirable to also hold that portion of the wrapper which lies outside the line of the knife to the cutting-bed. While this also may be effected in any suitable manner, that portion 9 of the cutting-bed which lies outside the knife is preferably made hollow and is provided with a line of perforations 10, which lie close to the knife. This hollow portion 9 of the cutting-bed is connected in any suitable way with the suction mechanism. Preferably, however, it is provided with perforations 11 at each end, these perforations connecting with hollow blocks 12, which rest upon the support 1 and which assist in supporting the bed. These hollow blocks are in turn connected by pipes 13 to the air-box 7. The portion 9 of the cutting-bed may be additionally supported on the bracket 1 in any suitable manner. It is shown, however, as supported by means of short legs 14. It is obvious that a tobacco-leaf can be laid by the operator on the cutting-bed and suitably smoothed and stretched over the knife, after which it will be held in position by the suction mechanism operating through the perforated plate 4 and the perforations in that part 9 of the cutting-bed which surrounds the knife.

While any suitable form of mechanism may be used to coöperate with the knife in severing the leaf, the cutting operation will preferably be performed by means of a roller 15, which is caused to reciprocate over the knife. The coöperating cutting-roller may be variously mounted. Preferably, however, (see Figs. 2, 3, 7, and 7ª,) it will be journaled in a forked arm 16, said arm being connected to a reciprocating plate or carriage 17, by the movement of which the roller is carried over the cutting-bed. The reciprocating plate 17 is provided on its rear side with a dovetailed groove which engages a dovetailed projection 18 on a plate 19, which may be either formed on or suitably connected to the frame of the machine. The carriage may be given its reciprocating movement in any suitable manner. Preferably, however, it is operated from a crank-arm 20, said arm being connected to the carriage or plate 17 by means of a link 21. Difficulty has been heretofore experienced in cutting mechanisms of this general class in effecting a clean cut where the roller moves over the cutting-blade in a plane which is at right angles to the knife and mechanisms more or less complicated and unsatisfactory and employing a plurality of rollers have been devised for enabling the rollers to reciprocate over the knife in a plane which stands at a more or less acute angle to the knife, thereby enabling the rollers to effect a shear cut. In the preferred form of the invention this shear cut is effected by the arrangement to be hereinafter described.

The arm 16, which carries the roller, is pivoted to a bearing-piece 22, said bearing-piece being also pivoted between ears 23, mounted on the plate 17. This bearing-piece 22 has an extension 24, which extension engages a cam-groove 25 in a shifting cam-plate 26. (See Fig. 7ª.) This shifting cam-plate 26 is controlled and guided in its movement by ways 27, which are secured to a plate 28. This plate 28 is cast on or secured in any suitable manner to the carriage 17 and moved therewith. The cam-plate 26 is provided with extensions 29 and 30. The frame of the machine has secured thereto suitable stops 31 and 32, the stop 31 being located in a position to be struck by the extension 29 just at the time when the carriage 17 completes its forward stroke and the stop 32 being located so as to be struck by the extension 30 just as the carriage completes its return stroke. It will be readily understood that as the carriage 17 completes its forward stroke the extension 29 coming into contact with the stop 31 will throw the cam-plate backward, said plate being guided in its movement by the ways 27. This movement of the cam-plate rocks the bearing-piece 22 and the arm 16, which is pivoted thereto. The cam-groove 25 is so arranged that it always holds the arm 16 and the roller 15 at an angle to the plane in which the top of the knife is contained. As the roller moves forward, therefore, it forms an acute angle with one side of the knife, and when its forward stroke is completed its position is shifted, so that it forms an acute angle with the other side of the knife. The position of the roller on both strokes is clearly shown in full and dotted lines in Fig. 3 of the drawings. By causing the roller to thus stand at an angle which is slightly acute to the knife in both its movements it coöperates with a part of the knife only during each stroke and enables it to effect a shearing cut which is clean and effective. The arm 16 is preferably spring-held, this being effected by connecting it to a spring 33, which is suitably secured to the carriage 17. The downward movement of the roller under the stress of the spring is limited by a stop 34, which is also suitably secured to the carriage 17. It is apparent that the carriage carrying the roller 15 receives only an intermittent reciprocation. After the wrapper is placed in position on the cutting-bed the roller is caused to reciprocate across the bed and cut the wrapper, after which it remains inactive while the remainder of the operations of the machine are performed.

Any suitable mechanism may be employed to effect the intermittent reciprocations of the carriage. Preferably, however, the main shaft 35 of the machine is provided with a beveled gear 36, meshing with a beveled gear 37, mounted on a counter-shaft 38, which is supported in brackets 39, suitably connected to the machine-frame. The shaft 38 is provided with a sprocket-wheel 40, around which passes a sprocket-chain 41. This sprocket-chain 41 passes over a sprocket-wheel 42, which is mounted on a sleeve 43. This sleeve 43 surrounds a short shaft 44, one end of which is supported by a bracket 45 and the other end of which passes through the sleeve 43, the sleeve at this end of the shaft being supported by a bracket 46. (See Figs. 2 and 3.) The crank-arm 20, before referred to, which is connected by the link 21 to the reciprocating carriage 17, is suitably connected to the shaft 44, as by being cast in one piece therewith. The shaft 44 is provided with an arm 47, said arm carrying a pivoted pawl 48, (see dotted lines in Fig. 7,) which pawl is normally held out of engagement with a notched collar 49, connected to and rotating with the sleeve 43. The sleeve 43 and the wheel 42 being geared to the main shaft are of course constantly rotating. So long, however, as the pawl 48 is out of engagement with the notched collar 49 the wheel 42 and sleeve 43 will rotate without producing any movement of the shaft 44, which carries the crank-arm 20. If, however, the pawl 48 be caused to engage the notch in the collar 49, the shaft 44 will then be rotated with the sleeve and the sprocket-wheel 42. The tail of the pawl 48 lies in the path of an arm 50, (see dotted lines in Fig. 7,) which arm is connected to a short rock-shaft 51, the said rock-shaft being suitably journaled in brackets connected to the frame of the machine. The shaft 51 has connected to its other end an arm 52, which lies in the path of a cam 53, said cam being located on a wheel 54, which is mounted on a counter-shaft 55, which is one of the main cam-shafts of the machine. The shaft 55 carries on its opposite end a worm-gear 55$^a$, which meshes with a worm 55$^b$ on the main shaft 55. It will be readily understood that as the wheel 54 rotates the cam 53 will strike the arm 52 and rock the shaft 51. This movement of the shaft 51 causes the arm 50 to move out from under the tail of the pawl 48, thus allowing it to swing forward into position to engage the notch in the collar 49 when it comes in position beneath it. The parts are so timed that the notch in the collar 49 comes into position to be engaged by the pawl partially as soon as this pawl is allowed to swing forward. The shaft 44, by the engagement of the pawl 48 and the notched collar 49, is now rotated, and the reciprocating carriage is caused to move the cutting-roller 15 across the knife. As soon, however, as the cam 53 passes out from under the arm 52 the shaft 51 is rocked by means of a spring 56, so that its arm 50 is in position to engage the tail of the pawl 48 as the same comes around and disconnect it from the notch 49. This occurs as soon as the shaft 44 has made one complete revolution, which has caused a complete reciprocation of the cutting-roller.

In order that the shaft 44 may be stopped in the proper position, the arm 47, before referred to, is provided with a stop-block 57, (see Fig. 2 and dotted lines in Fig. 7,) which is also in position to engage the end of the arm 50 when the same is in the position in which it holds the pawl 48 out of engagement. When the arm 47 is near the end of its rotation, the tail of the pawl 48 is first engaged by the arm 50 and the pawl is disconnected from the notched collar 49, after which the stop-block 57 strikes the end of the arm 50 and prevents any further rotation of the arm 47 and the shaft 44 until the shaft 51 is again rocked by the action of the cam 53 on the wheel 54. It will be understood, of course, that the wheel 54 makes one complete rotation for each cycle of operations of the machine, so that a wrapper is cut for each cigar which is wrapped and delivered.

A wrapper having been cut by the operation of the construction so far described, it is necessary to remove it from the cutting-bed and carry it over and deliver it to the wrapping mechanism, which will be hereinafter described. The devices by which the cut portion of the wrapper is removed from the cutting-bed may be very considerably varied. Preferably, however, this function will be accomplished by mechanism which will now be described.

Referring to Figs. 5, 6, 12, and 13, it will be seen that the pipe 6, which communicates with the suction-chamber covered by the perforated plate 4, is provided on its side with a stud 58. This stud 58 is engaged by the fork of one of the arms, 59, of a rock or bell-crank lever, the other arm, 60, of which is provided with a roller 61. This lever 59 60 is pivoted on a stud 62, which finds a bearing in a socket 63, suitably mounted in a U-shaped frame-piece 179, hereinafter referred to. The roller 61 of the arm 60 runs on the surface of a rotating cam 64, said cam being mounted on a counter-shaft 65, which is one of the main cam-shafts of the machine, said counter-shaft being driven by a worm-wheel 66, which engages with a worm 67 on the main power-shaft 35. The cam 64 is provided with a depression 68, and the lever 59 60 is held against the surface of the cam by a suitably-arranged spring 69. (See Fig. 12.) The shaft 65, which carries the cam 64, is arranged to receive one complete rotation for each cycle of operations of the machine, and once in the rotation of this shaft the depression 68 passes under the roller 61 and allows the spring 69 to raise the rock-lever 59 60. The rock-lever in turn raises the pipe 6 and carries that part of the cutting-bed which is covered by the perforated plate 4 and which supports the cut wrapper up into the position indicated by dotted lines in Fig. 12.

In order that the cut wrapper may be removed from the perforated plate 4, it is preferable, though not necessary, that the suction be cut off. This may be accomplished in a variety of ways. In the machine shown the cam 64 is provided with a block 70, (see dotted lines in Fig. 12,) which just after the roller 61 drops into the depression 68 strikes the tail of a lever 71, pivoted at 72 on a plate 73, suitably connected to the frame of the machine. This lever 71 is connected by a link 74 to a slide-valve 75, (see Fig. 13,) which is arranged to cut off the main conduit 8 by which the air is exhausted from the suction-box 7. The lever 71 is held down in position to keep the valve 75 open by means of a spring 76, which is connected to the lever and the plate 73.

It is apparent that as the wheel 64 rotates the valve 75 would open as soon as the block 70 passed the tail of the lever 71. In order to prevent this and to keep the suction-pipe 8 shut off as long as may be desired, the lever 71 is provided with a projection 77, which is engaged, when the lever is raised, by a latch 79, pivoted at 80 on the plate 73 and held to its duty by means of a spring 81. The latch 79 is provided with a handle 82, (see Fig. 6,) by which the operator is enabled to release the lever 71 when desired. After the operator releases the lever by throwing the latch, the spring 76 draws down the lever 71 and the valve 75 and opens the pipe, thus turning the suction into the box 7.

After the perforated plate 4 and the suction-chamber, which it covers, are raised into the position shown in dotted lines in Fig. 12 the cut wrapper is removed therefrom. The instrumentalities by which this is accomplished may be widely varied. In the machine shown there is provided a wrapper support or carrier 83. (See Figs. 1, 4, 5, and 9 to 11.) This wrapper-support is provided with means for retaining a wrapper in position thereon, which means may be widely varied. Preferably, however, this support will be constructed in the form of a suction-chamber, said chamber being covered by a perforated plate 84. The support 83 is connected in any suitable manner to a barrel or chamber 85, said chamber being cut at one side, as shown at 85' in Fig. 10$^a$, to form an air-outlet. The barrel or chamber 85 is preferably mounted in a chamber 86, the said chamber being in turn mounted in a carrier, which may be of any suitable construction. As shown, it consists of two cross-bars 87 88, which are connected in any suitable manner, as by webs 89. The bar 88 is provided with an extension 90, the purpose of which will be hereinafter stated. The barrel 85 in the construction shown is mounted to rotate in the chamber 86 and is preferably provided with an upwardly-extending lug 91, said lug extending through a perforation in the bar 88. The lug 91 has secured thereto an arm 92, through which the chamber 85 is rotated in the manner to be hereinafter described. The chamber 86 has an opening in one side thereof, and to this opening is connected a pipe 93, the said pipe being a part of the connections by which the suction is transmitted to the chamber 86. After the wrapper has been cut and raised into the position indicated in dotted lines in Fig. 12 a relative movement must be effected between the cutting-bed and the support, so that the bed may deliver the wrapper to the support. To this end the carrier, which consists of the bars 87 88, is preferably mounted on the end of a swinging lever 94, the said lever being provided with a hollow central boss 95, which rests upon a perforated bridge-piece 96, (see Figs. 1 and 4,) this bridge-piece being suitably supported in the frame of the machine. Extending through the perforated boss in the lever 94 is a pipe 97, said pipe being preferably surrounded by a torsional spring 98, one end of which is connected to the bridge-piece 96 and the other end of which is secured to a collar 99, which will be hereinafter described. The pipe 97 is formed with a shoulder which rests upon the bridge-piece, and the lever 94 and the pipe are connected by means of a set-screw 100 or in any other suitable manner, so that the lever moves with the pipe when the pipe is moved by agencies to be hereinafter described. The upper end of the pipe supports an elbow 131. This pipe 132 preferably has a spring end 133. Suitably supported in the frame of the machine is a pipe 134, which connects with any suitable blast device, this pipe being located so that as the support 83 swings into the position where the end of the wrapper is to be taken by the wrapping mechanism the spring or flexible section 133 engages with its end. When, therefore, the support is in the position where the wrapper is to be delivered to the wrapping mechanism, which is the position illustrated in Fig. 1, the blast, acting through the pipes 134 132, blows the end of the wrapper down upon the bunch in the wrapping mechanism and into a position where it can be taken by the wrapping mechanism.

While the means just described are a convenient means for positively inserting the end of the wrapper into the wrapping mechanism, so that it will be taken by it, any other suitable devices may be used for this purpose, or, if desired, the inserting devices for the end of the wrapper may be omitted altogether, for it will be understood, of course, that the end of the wrapper will hang down from the support as the same is moved away from the cutting-bed and may be brought into position where it will be taken by the wrapping mechanism purely by the movement of the support. Preferably, however, inserting devices will be used, as better results are obtained thereby.

The wrapping mechanism used in the machine may be of any suitable or well-known type. Preferably, however, the wrapping mechanism will be generally of the type disclosed in the patent to Reuse, No. 552,447, granted December 31, 1895, and more specifically will correspond in construction with the machine forming the subject of my copending application, Serial No. 4,075, filed February 5, 1900. A specific description of the mechanism herein shown is accordingly unnecessary, reference being made to the said patent and copending application for a full disclosure of the construction.

For the purposes of this application it is sufficient to say that the wrapping mechanism is mounted on a cutting-bed 135 and consists of two pairs of pivoted intermeshing jaws 136 137, (see Figs. 1, 14, and 15,) between which the cigar-bunch is held and by the operation of which the bunch is rolled to wind the wrapper thereon. The jaws 136 are operated by means of a rotating rod or shaft 138 and the jaws 137 are operated by a similar shaft 139. A shaft 140 is located in the frame of the wrapping mechanism, which shaft serves to operate the devices for removing the wrapped cigar from the wrapping-jaws. The devices for removing the cigar from the jaws may be of any suitable character. In the machine shown, however, they consist of displacing-arms 141, said arms being secured to a sleeve 142, which is suitably secured to the shaft 140. Knives 143 (only one of which is shown) are carried on arms 144, said knives serving to trim the ends of the finished cigar, the cigar, which the present machine is constructed to make, being of the form known as a "cheroot" and having both ends trimmed.

The operating-rods for the jaws are driven from a gear 145, mounted on a shaft 146, (see Fig. 5,) the several pinions for the rods meshing with said gear, as in my copending application before referred to. The shaft 146 carries a sprocket-gear 147, which is mounted loosely on the shaft 146, and may be clutched thereto and unclutched therefrom by any suitable form of mechanism, the clutch mechanism described in my copending application being a preferable one. The gear 147 is driven by a sprocket-chain 148, said chain passing around the gear 149, which is mounted on a short shaft 150, said shaft being journaled in a bracket 151, suitably mounted on the frame of the machine. (See Fig. 8.) The other end of the short shaft 150 is provided with a sprocket-wheel 152, said sprocket-wheel being driven by a chain 153, which engages with a gear 154, mounted on the main shaft 35.

The clutch mechanism by which the gear 147 is clutched to the shaft 146 may be controlled in any suitable manner, so as to start and stop the wrapping mechanism. A pivoted arm 155 (see Fig. 5) is shown for this purpose, the said arm being operated by a cam 156, carried on a shaft 157, which shaft is mounted in the frame of the wrapping mechanism. The clutch connections operated by the arm 155 are omitted as unnecessary to the understanding of the present invention; but they will preferably correspond to those shown in my copending application.

The shaft 157 may be operated to start and stop the wrapping mechanism in any suitable manner. It is shown, however, (see Fig. 5,) as provided with a segment 158, which segment is engaged by a segment-arm 159, pivoted at 160 on the frame of the machine. This arm 159 is provided on the end opposite the segment with a stud 161, which engages a cam-groove 162 in a cam 163, the said cam being mounted on the shaft 65, which has been before described, and which also carries the cam 64, which has been before described as operating to raise the cutting-bed. The cam 163 is arranged so as to make one revolution during the time required to wrap the bunch and acts through the connections which have been described to both stop and start the wrapping mechanism. The shaft 157, as in my copending application before referred to, carries a striker-arm 164, (see Figs. 1, 5, and 15,) the said arm operating through connections which will be hereinafter described to rock the shaft 140 and operate the displacing-arms 141, which in the present machine lift the wrapped cigar from the wrapping-jaws.

While the bunch may be placed in the wrapping-jaws by hand, if desired, and removed from the displacing-arms in the same 101, one end of which extends into the pipe and is provided with a flange 102, which flange rests upon the top of the pipe. A collar 103 is preferably provided for holding these parts snugly and securely in position, which collar is secured in position on the central boss 95 by screws or in any other suitable manner. A section of pipe 104 (see Fig. 10) extends into the elbow and into the pipe 93, before referred to, which pipe connects with the chamber 86. The fit between the pipes 104 and 93 is sufficiently tight to form a good joint and yet sufficiently loose to allow the pipe 93 to have a sliding movement on the pipe 104. A telescopic connection is thus formed between the chamber and the pipe 97.

The collar 99, before referred to, is preferably provided with a short segmental rack 105, said rack being engaged by a segment-lever 106, said lever extending from a boss 107, mounted on a pivot 108, suitably located in the frame of the machine. From the boss 107 extends another arm 109, said arm being provided with a cam-stud 110, which stud engages a cam-groove 111, formed upon the cam-wheel 54, the cam-wheel being supported on the counter-shaft 55, hereinbefore referred to. As the cam-wheel 54 rotates it will be seen that the pipe 97 and the lever 94, which is, as has been said, connected to the pipe by a set-screw 100, are caused to rotate about the axis of the pipe, backlash and looseness in the gearing being avoided by the torsional spring 97. The carrier, composed of the bars 87 88, is pivoted to the outer end of the lever 94, the pivot being marked 113. (See Fig. 9.) As the lever 94 swings on its center, therefore, the carrier and the wrapper-support carried thereby will be carried with it. In the rear end of the lever 94 are journaled two short upright shafts 114 115. (See Figs. 9 and 10.) The short shaft 114 is provided on its upper end with an arm 116, said arm being connected by a rod 117 to the extension 90 of the bar 88. The lower end of the shaft 114 is provided with an arm 118, which arm carries a downwardly-projecting stud 119. This stud engages a cam-groove 120 in a cam-plate 121, suitably mounted in the machine. (See Figs. 1 and 10.) In the same manner the shaft 115 is provided on its upper end with an arm 122, which arm is connected by a rod 123 to the arm 92, the arm 92 being, as before stated, connected to the lug 91 of the chamber 85. The lower end of the shaft 115 carries an arm 124, said arm being provided with a stud 125, which engages a cam-groove 126 in the plate 121, before referred to. The construction being as before described, it will be understood that as the lever 94 receives the swinging movement before described, the cam-grooves 120 126 will impart a rotation to the shafts 114 115. The rotating movement of the shaft 114 will cause the carrier 87 88 to swing upon the pivot 113, by which it is mounted in the lever 94. The rotating movement of the shaft 115 will give the support 83 a movement about its own axis. It will be seen, therefore, that as the lever 94 swings a movement will be given to the support 83, which is the resultant of the swinging movement of the lever on its center, the swinging movement of the frame on its center, and the pivotal movement of the support on its own axis. The functions and results of this peculiar movement of the support will be hereinafter more fully stated.

Any suitable means may be provided for maintaining a suction in the pipe 97. In the machine shown the lower end of the pipe is engaged by an elbow 127, which elbow is supported by a hanger 128, suitably secured to the bed of the machine. (See Fig. 4.) This elbow connects with a pipe 129, which runs to any suitable suction device—as, for instance, a fan. (Not shown.)

It may be here remarked that the suction will preferably be continuously maintained in the pipe 97. The suction is therefore constantly acting through the perforated plate 84, so that the suction-support is always sure to be in condition to take a cut wrapper from the cutting-bed. Furthermore, since the suction is not cut off from the support during the wrapping operation, the wrapping mechanism, to be hereinafter described, pulls the wrapper from the support against the force exerted by the suction. The wrapper is therefore stretched by these two opposing forces, and is consequently wound upon the cigar smoothly and tightly and in a stretched condition. Furthermore, since the cut wrapper which has been cut on the cutting-bed in a stretched condition is immediately transferred to the suction-support and is held by that support in a stretched condition until it is finally wound upon the cigar, there is not the liability of the leaf contracting after cutting, as exists where the leaf is delivered from the cutting-bed to a transferring mechanism and again from the transferring mechanism to another mechanism, which finally delivers it to the wrapping devices. After the suction-support has taken the wrapper from the cutting-bed it moves into a position where it begins to deliver the wrapper to the wrapping mechanism. It is necessary, of course, that that end of the wrapper which is first presented to the wrapping mechanism shall be so controlled as to place it in position to be seized by the wrapping mechanism. In order to effect this, the wrapper-support may be variously constructed. In the machine shown the support 83 is provided with a partition 130, (see Fig. 9ª,) which forms a small chamber 131 in that end of the support which carrries the portion of the wrapper which is first wound upon the cigar. The suction-plate 84, before described, covers this chamber 131; but the partition 130 prevents the suction, which acts through the pipes extending to the support, from exercising any action in the chamber 131. A small elbow-pipe 132 is connected to the support 83 and communicates with the chamber manner, an automatic mechanism is preferably provided, by which one or both of these functions may be accomplished. Mechanisms widely varying in constructions may be employed for the purpose of carrying out these functions. Preferably, however, the mechanism will be of the character hereinafter described.

The machine is shown (see Figs. 1, 5, and 6) as provided with a bunch-receptacle 165, said receptacle being mounted on arms 166, said arms being connected, preferably, by being cast in one piece therewith to a bracket 167, which is bolted or otherwise secured to the frame of the machine. The bunch-receptacle 165 has an open bottom, and in order to maintain the bunch therein a sliding fork 168 is provided, the prongs of said fork extending under the open bottom of the bunch-receptacle when the fork is in its forward position. The fork is operated by a lever 169, pivoted to an ear 170 on the bracket 167. A spring 171 is provided which normally holds the lever in such position that the prongs of the fork are beneath the bottom of the receptacle, and the lever is suitably connected, as by a short link, to the sliding fork. Normally, therefore, the fork 168 is held in the forward position, with its prongs beneath the open bottom of the receptacle 165 and serving, therefore, to support the bunch which is placed in the said receptacle by the operator.

While the mechanism which serves to transfer the bunch from the receptacle 165 to the wrapping mechanism may be of any suitable form, it preferably embodies a shaft 172, (see Figs. 1, 5, and 17,) the said shaft being mounted in ears 173, 174, and 175, formed on an arm 176. This arm 176 is secured to, preferably by being cast therewith, a circular stud 177, said stud being mounted in a boss 178 in a U-shaped frame-piece 179, which boss is suitably secured to the main frame of the machine. The stud 177 is provided with a pinion 180, which is fast to the stud. When the pinion is rotated by the mechanism hereinafter described, it will be seen that the arm and stud are given a swinging movement about the center of the stud, the extent of said movement corresponding to the amount of rotation given to the pinion. While the pinion 180 may be rotated in any suitable manner, it is preferably engaged by a segment formed on a swinging arm 181, said arm being secured to a vertical shaft 182, which has its upper end stepped in a bearing 183 in the U-shaped frame-piece 179, before described, and is further supported in a bearing 184, formed in an arm 185, extending from the U-shaped frame-piece 179. The shaft 182 carries at its lower end an arm 186, which is provided with a downwardly-depending stud 187. This stud 187 has a sliding connection with a link 188, which is pivoted at 189 to a small bracket 190, extending from the machine-frame. The sliding connection between the link 188 and the stud 187 on the arm 186 may be formed in any suitable manner. Preferably, however, the arm has upturned shoulders 191 on each side of its outer end, these shoulders forming a groove in which the stud 187 engages. The outer end of the arm 188 is provided on its under side with a pin 192, which engages with a cam-groove 193, formed in a roll or cam 194, mounted on the shaft 65, before referred to. While the vertical shaft 182 may be rotated by any suitable means, the construction described is a preferable one, inasmuch as it multiplies the effect of the cam and gives a long swing to the arm 186.

The shaft 172 is provided on each side of the arm 176 with collars 195, which prevent any lengthwise movement of the shaft in the bearings or ears 173 174 175. On its outer end the shaft 172 is provided with a sleeve 196, the said sleeve having a frictional engagement with the shaft, so as to turn therewith, (see Fig. 17,) but also being capable of a limited rotation on the shaft and being held in position between the collar 195 and a washer 197. The sleeve 196 has secured thereto a collar 198, said collar having formed thereon or secured thereto two hook-shaped projections 199 and 200, these hook-shaped projections coöperating with other hook-shaped projections, to be hereinafter described, to form bunch-retainers. At its opposite end the sleeve 196 is provided with another collar 201, which carries similar hooked projections 202 and 203, the collar 201 being also secured to and turning with the sleeve. Mounted on the sleeve 196 and free to rotate thereon is a second sleeve 204. This sleeve 204 carries at one of its ends a collar 205, provided with two projections 206 and 207, which coöperate with the projections 199 and 200, and at its other end the sleeve 204 is provided with a collar 208, which is provided with projections 209 210, said projections coöperating with the projections 202 and 203 to form retainers. The sleeves 196 and 204 are slotted, as shown, and projecting through the sleeves on one side thereof and tapped into the shaft are two studs 211, which carry forks 212. Projecting from the shaft through slots in the sleeves on the opposite side thereof are similar studs 213, carrying forks 214. These forks keep the bunch or cigar, as the case may be, properly centered when the retainers are opened and closed in the manner to be hereinafter described, and the studs on which they are mounted limit the rotating movement of the sleeves.

The sleeves 196 and 204 are held in the position indicated in Figs. 15, 18, and 19—namely, in closed position—by means of a suitably-arranged spring 215. Any suitable means may be provided for turning the sleeves against the stress of this spring, so as to open the retainers. Preferably, however, the collar 198 will be provided with two ears 216, one extending from each side thereof, and in these ears are mounted pins 217. Similarly the collar 205 is provided with ears 218, from which project pins 219. A device is provided at each end of the throw of the shaft 172 to enter between the pins 217 and 219 and thus open the jaws.

Referring to Fig. 6, in which the bunch-holder is shown as receiving a bunch from the receptacle 165, it will be seen that the bracket 167 carries a pointed pin or plate 220. This pin or plate enters between the ears 216 and 218 as the shaft swings the bunch-holder around, and thus rotates the sleeves upon each other and the shaft and causes the retainers to open to receive a bunch. At practically the same time this occurs the ends of the ears 216 strike the lever 169 and cause it to turn on its pivot against the stress of the spring 171, thus sliding back the fork 168 and permitting the bunch in the receptacle 165 to drop into the space between the jaws. Then through the operation of the cam and connections before described the shaft 182 is operated, causing the arm 176 to turn on the stud 177 and carry the bunch around to the wrapping mechanism, the bunch being carried by the set of retainers which is then uppermost. Any suitable form of retaining devices may be substituted for the hooks which have just been described. Furthermore, while the sleeves form a convenient and satisfactory means for operating the retaining devices, other suitable forms of mechanism may be substituted therefor.

Before the bunch which is carried by the upper set of retainers is delivered to the wrapping mechanism the cigar which has been wrapped by the wrapping mechanism has to be removed therefrom and placed in position in the lower set of retainers. To effect this in the present machine, the displacing-fingers 141 must be operated to remove the cigar from the wrapping mechanism and the under set of retainers on the bunch-transferring mechanism must be opened to receive the cigar. Any suitable means may be employed to effect these functions. Preferably, however, the shaft 140 (see Figs. 12 and 15) is provided with a pawl-arm 221, which is loosely mounted on the shaft, this pawl-arm having pivoted thereon a pawl 222, which is held forward to its duty by means of a spring 223. Also loosely mounted on the shaft 140 is a collar 224, carrying a cam 225. This cam 225 operates a small two-armed lever 226 227. The arm 226 carries a bowl 228, which lies in the path of the cam 225, and the other arm 227 is provided with a wedge-shaped projection 229, which when the two-armed lever is operated enters between the pins 217 219, which are connected to the sleeves carrying the retainers, before referred to. When the bunch-transferring mechanism is in position, so that the lower set of hooked jaws are over the wrapping mechanism, the shaft 157, which has been before referred to as located in or near the frame of the wrapping mechanism, is operated by the means before described, and the arm 164 strikes the arm 221. At this time the spring 223 has thrown the pawl 222 upward, so that it engages the notch in the collar 224. The advancing movement of the arm 164 carries the arm 221 with it and also turns the collar 224 on the shaft 140. This of course causes the cam 225 to move and rock the two-armed lever 226 227, forcing the wedge-shaped projection 229 between the pins 217 219, and thus rotating the retainer-carrying sleeves of the bunch-transferrer and opening the retainers. The arm 221 is provided with a stud 230, and lying in the path of this stud is a projection 231, which is fast to and preferably cast in one piece with the sleeve 142, which carries the displacing-arms 141. The sleeve 142 is, as has been before said, fast on the shaft 140. As soon as the stud 230 strikes the projection 231 the continued forward movement of the arms 155 and 221 rocks the shaft 140 and raises the displacing-arms, so that the wrapped cigar is removed from the wrapping mechanism into the retaining devices of the bunch-transferring mechanism. As soon as the cigar has been placed in the grasp of the retaining devices the tail of the pawl 222 strikes a fixed stop 232, which lies in the path of said pawl. This stop 232 forces the pawl 222 out of the notch in the collar 224. A suitable spring 235 now operates to throw the collar and cam 225 back into their original position, and the two-armed lever 226 227 is thrown back by a spring 236, provided for that purpose, thus permitting the retainers to close on the cigar. At the time this is accomplished the arm 164 has completed its forward movement and is now returned by any suitable means, as a spring, (not shown,) thus permitting the displacing-arms to resume their normal position or the position shown in Fig. 15. It is now necessary in the present machine to operate the bunch-holder, so as to bring the set of retainers holding the bunch on the upper side into position to transfer the bunch to the open jaws of the wrapping mechanism. While this operation of the bunch-holder may be effected in various ways, it is preferably accomplished by providing the shaft 172 with a pinion 237, the said pinion being located between the ears 174 175. (See Fig. 5.) The stud 177 has a vertical opening through its center, and through this opening works a rod 238, said rod being provided with rack-teeth which engage with the pinion 237. The lower end of the rod 238 is connected by a link 239 to a rock-lever 240, pivoted on the U-shaped frame-piece 179. Connected to this rock-lever is an operating-rod 241, said rock-lever having a bowl 242, which engages with a cam-groove in the side of the cam-roll 163. The lower end of the rod 241 is provided with a fork 243, which straddles the shaft 65 and guides the rod in its movement. At the time, therefore, when the bunch-holder is to be operated to bring the bunch into position to be delivered to the wrapping mechanism the lever 240 is moved through the connections before described, and the rack-rod 238 is raised, thus rotating the shaft 172 and the bunch-carrying sleeves which turn therewith. As soon as the bunch-holder has been turned over the arm 164 is again operated to make a short forward movement, the cam 162 being so shaped as to effect this movement of the arm through the connections which have been described. As the arm 164 makes this second movement it again strikes and carries with it the arm 221, which in turn, through the pawl 222, turns the notched sleeve 224 and the cam 225. This movement of the arm is not, however, sufficiently great to cause the tail of the pawl to strike the stop 232. The cam 225 again operates the two-armed lever 226 227, forcing its wedge-shaped projection 229 between the other set of pins on the bunch-holder and again rotating the sleeves and parting the retainers. The bunch now drops into the wrapping-jaws, after which a wrapper is presented to it, and the wrapping operations proceed. As the wrapper-carrier 83 swings into position to deliver a wrapper to the wrapping mechanism the tip end of the wrapper will preferably be provided with a little paste, as is common in the art. While the pasting of the wrapper may be effected in various ways, there will preferably be provided a paste-fountain 244, said fountain being mounted on a bracket-arm 245, which is suitably secured to the frame of the machine. The paste-fountain is provided with an applying-roller 246, which is so positioned that the wrapper which is held by suction on the wrapper-support will touch it as the support comes into its extreme backward position. The roller thus supplies to the wrapper the small amount of paste necessary to hold the wrapper in position on the cigar.

The main shaft 35 is operated from any suitable source of power by means of a belt-pulley 247. This pulley is preferably loosely mounted on the shaft and is provided with projections which are engaged by a clutch-collar 248, suitably splined on the shaft. This clutch-collar 248 is engaged by a fork 249 on a clutch-controlling rod 250, which rod is mounted in ears 251 252 on the machine-frame. (See Fig. 8.) A spring 253 surrounds the rod 250 and normally holds the rod 250 in such position that the projections on the collar 248 will be out of engagement with the projections on the pulley. The rod 250 is provided with a stud or pin 254, which lies in the path of one of the arms 255 of a three-armed lever which is pivoted on the side of the machine. Another arm 256 of this lever is connected by means of a rod 257 to any suitable source of power—as, for instance, a treadle. (Not shown.) The third arm 258 of the lever lies in the path of the latch 259, suitably pivoted on the machine-frame. When the operator desires to start the machine, the rod 257 is thrown up by any suitable means, thus rocking the three-armed lever and forcing the rod 250 forward, so that the projections on the clutch-collar 248 are thrown into engagement with the projections on the pulley 247. At the same time the latch 259 takes over the arm 258 of the lever, and thus holds the parts in position, so that the machine will run until the latch 259 is allowed to release the lever.

The general operation of the machine is as follows: The operator having placed a bunch in the bunch-receptacle 165 places a tobacco-leaf on the cutting-bed, stretching it thoroughly and carefully, so as to get the most out of the leaf. The handle 82 is then operated, permitting the spring 76 to draw down the lever 71 and the valve 75, thus turning the suction onto the suction-box 7. By the time this has been accomplished the wheel 54 through the medium of its cam 53 has operated the rock-shaft 51 and permitted the pawl 48 to engage the notched collar 49. The shaft 44 is now rotated and causes the carriage 17 to advance. The roller 15, which, it will be remembered, is held at an angle to one side of the cutting-die, is now advanced over that side of the die. At the time when the carriage completes its forward stroke the extension 29 strikes the stop 31 and shifts the cam-plate 26. This rocks the bearing-piece through its extension 24 and turns the roller, so that it stands at an angle to the other side of the cutting-die. The carriage now returns, causing the roller to roll over to the other side of the die and complete the cutting of the wrapper. When this is accomplished, the arm 50 releases the pawl 48 from the notched collar 49, and the carriage-operating mechanism is brought to a stop, the cam-plate 26 having in the meantime been operated through the extension 30 and the stop 32 to return the roller to its original position. As soon as the cutting of the wrapper is completed the cam 64 causes the lever 59 60 to raise the pipe 6 and with it that part of the cutting-bed which is covered by the perforated plate 4. Inasmuch as the part of the wrapper outside the line of cut is held by the perforations in the cutting-bed 9, the outer part of the wrapper will be cleanly separated from the cut portion even though the cutting mechanism should fail to quite sever it. While the operations before mentioned have been going on the pipe 97 has been rotated through the medium of the cam-groove 111 and the swinging segment 106 into such a position that the suction-support for the wrapper is fairly over the cutting-bed. As soon as the suction-support 83 comes into position over the cutting-bed the suction in the pipe 6 is cut off by the operation of the cam-block 70 on the lever 71, which raises the valve 75. It will be remembered that the suction is constantly on in the pipe 97, so that as soon as the suction is cut off from the cutting-bed, as before described, the wrapper will be transferred to the suction-support and in a fully-stretched condition. As soon as the suction-support has taken the wrapper the segment 106 reverses its movement, and the pipe 97 is swung back. The suction-support is thus carried back, and, through the medium of the cam-grooves 120 and 126, the connecting-rods 117 and 123, and the parts connected therewith, it is brought into the position indicated by the series of dotted lines on the right in the diagram illustrated in Fig. 20. As the support comes into this position the pipe 133 engages with the pipe 134 and the end of the wrapper which is to wrap the tuck end of the cigar is blown down onto the bunch, which is supposed to be in the jaws of the wrapping mechanism. The tip end of the wrapper has been pasted by contact with the roller 246. As soon as the wrapper is thus blown down upon the bunch the wrapping-jaws close upon it and the wrapping mechanism operates through the medium of the parts which have been described. As the wrapping continues the movement of the pipe 97, caused by the segment 106, and the movement of the pivoted carrier 87 88 on its pivot and the suction-support 83 on its pivot cause the support to assume the successive positions indicated by the dotted lines in the diagram shown in Fig. 20.

The cigar which is intended to be wrapped in the present machine is what is known in the trade as a "perfecto" shape—that is to say, its largest diameter is in the middle of its length. In order that the wrapper may be smoothly wound upon the cigar, therefore, it is desirable that the wrapper-support present the wrapper to the wrapping mechanism at constantly-varying angles as the wrapping proceeds, the angle starting with one that is acute to the axis of the bunch as the wrapping begins, increasing to a right angle at about the center of the bunch, and then again becoming acute, the wrapper being delivered at the smallest angle as the tip of the cigar is wrapped.

Since in this machine the wrapper-support is moved while the wrapping mechanism is stationary, the support must be given a movement which will cause it to simultaneously feed the wrapper to the wrapping mechanism, advance it along the wrapping mechanism, and vary the angle of its presentation. The movement of the wrapper-support is therefore in reality the resultant of three movements—viz., a movement by which the wrapper is fed to the wrapping mechanism, which may be termed an "approaching" movement, a movement along the wrapping mechanism, which may be termed a "traversing" movement, and a movement which varies the angle of presentation of the wrapper and which may be termed an "angular" movement. By the term "approaching" as used herein it is not, however, meant that all parts of the support are approaching the wrapping mechanism during the wrapping operation, for it is apparent that that part of the support which has delivered its parts of the wrapper to the wrapping mechanism moves away from said mechanism. Inasmuch, however, as that part of the support which is to deliver its part of the wrapping mechanism always moves toward it, the term "approaching" is thought to fairly define the movement.

It is further to be understood that while in this machine the wrapper is delivered by giving the various movements referred to to the wrapper-support the same result can be effected by giving a part or all of the movements to the wrapping mechanism, and such constructions are within the invention. As illustrating a construction in which the wrapping mechanism is moved reference is made to my application, Serial No. 4,074, filed of even date herewith. It will also be noted that in this machine the suction is constantly maintained in the suction-chamber of the wrapper-support. The wrapping mechanism is therefore caused to draw the wrapper from the support against the force of the suction. This keeps the wrapper fully stretched and at the same time causes it to be smoothly and tightly wound upon the bunch.

While the wrapping operation has been going on the bunch-transferring mechanism has received a bunch from the receptacle 165, and the shaft 172, which carries the mechanism, is swung, by means of the arm 176, around into a position over the wrapping mechanism. It will be understood, of course, that as soon as the wrapping is completed the wrapping mechanism stops with the jaws in an open position, as shown in Fig. 15. The arm 157 is now rocked, causing the arm 164 to strike the arm 221, thus operating the displacing-arms 141 and at the same time causing the two-armed lever 226 227 to open the retainers on the under side of the bunch-transferrer. As soon as the cigar has been placed within the grasp of the retainers the cam 225 is drawn back by its spring, thus permitting the two-armed lever 226 227 to be retracted and the sleeves carrying the bunch-retainers to be rotated by their spring, so that the retainers are closed. The arm 240 is now raised, causing the rack-rod 238 to rotate the shaft 173 through the medium of the pinion 237, thus bringing the bunch-retainers which hold the bunch into position over the wrapping mechanism. As soon as this is accomplished the arm 164 again moves forward sufficiently to cause the cam 225 to again rock the two-armed lever and open the bunch-retainers, so that the bunch drops into position in the wrapping mechanism. The bunch-holder, which has again been rotated so as to bring the retainers holding the cigar on the under side, is swung back into position under the bunch-receptacle 165. As it comes back into position the projection 220 enters between the ears 216 218 and opens the retainers, thus delivering the cigar, which drops into a chute provided for that purpose, and at the same time placing the upper set of retainers in position to receive a fresh bunch from the receptacle 165. The cycle of operations just described is then repeated.

It is to be understood that the mechanisms by which the various operations carried out by this machine are performed may be widely varied in construction and arrangement. Other constructions may be substituted for some of those employed, and the relative movements of some of the parts with respect to others may be effected not only by moving the parts described in this machine, but by moving the other parts, or by moving both parts. It will also be understood that some of the mechanisms are capable of use in structures in which the other mechanisms are not employed and that the independent use of such mechanisms is contemplated. The invention is not, therefore, to be limited to the particular mechanisms or the precise details of construction herein shown and described.

What I claim is—

1. In a cutting mechanism, the combination with a cutting-bed carrying a knife, of a device coöperating with the knife to produce a cut, means for producing a relative reciprocating movement between the coöperating cutting device and the bed, and means whereby the coöperating cutting device is caused to coöperate with one part of the knife on the forward stroke of the reciprocation and with the remainder of the knife during the return stroke, substantially as described.

2. In a cutting mechanism, the combination with a cutting-bed carrying a knife, of a device coöperating with the knife to produce a cut, means for reciprocating the coöperating cutting device over the knife, and means whereby the coöperating cutting device is caused to coöperate with one part of the knife on the forward stroke of the reciprocation and with the remainder of the knife during the return stroke, substantially as described.

3. The combination with a cutting-bed carrying a knife, of a roller coöperating therewith, mechanism for reciprocating the roller over the knife, and means whereby the roller is caused to coöperate with a part of the knife during one part of the reciprocation and with the remainder of the knife during the remainder of the reciprocation, substantially as described.

4. The combination with a cutting-bed carrying a knife, of a device coöperating with the knife to produce a cut, means for producing a relative reciprocating movement between the coöperating device and the knife, and means for holding said device at an angle to one part of the knife during one part of the reciprocation and at an angle to another part of the knife during the remainder of the reciprocation, substantially as described.

5. The combination with a cutting-bed carrying a knife, of a roller coöperating therewith, means for producing a relative reciprocation between the roller and the knife, and means for holding the roller at an angle to one part of the knife during a part of the reciprocation and at an angle to another part of the knife during the remainder of the reciprocation, substantially as described.

6. The combination with a cutting-bed carrying a knife, of a roller coöperating therewith, means for reciprocating the roller over the knife, and means for holding the roller at an angle to one part of the knife during a part of the reciprocation and at an angle to another part of the knife during the remainder of the reciprocation, substantially as described.

7. In a cutting mechanism, the combination with a cutting-bed having a knife, of a reciprocating carriage, a coöperating cutting device mounted in the carriage and caused to move over the knife by the movement of the carriage, means for shifting the position of the cutting device to coöperate with one part of the knife during a part of the movement of the carriage and with the remainder of the movement knife during the remainder of the movement of the carriage, substantially as described.

8. In a cutting mechanism, the combination with a cutting-bed having a knife, of a reciprocating carriage, a roller mounted therein which is caused to move over the knife by the movement of the carriage, means for shifting the position of the roller with respect to its carriage so as to cause the roller to coöperate with one part of the knife during the movement of the carriage in one direction, and with the remainder of the knife during the movement of the carriage in the other direction, substantially as described.

9. In a cutting mechanism, the combination with a cutting-bed having a knife, of a carriage reciprocating with respect thereto, an arm mounted in the carriage, a roller mounted in the arm, a pivoted support to which the arm is pivoted, and means for turning the support on its pivot during the reciprocation of the carriage and thereby varying the angle at which the roller acts upon the different parts of the knife, substantially as described.

10. In a cutting mechanism, the combination with a cutting-bed having a knife, of a reciprocating carriage, an arm mounted in the carriage, a roller mounted in the arm, a pivoted support to which the arm is pivoted, and a cam for controlling the position of the pivoted support and thereby varying the angle at which the roller acts upon different parts of the knife, substantially as described.

11. In a cutting mechanism, the combination with a cutting-bed having a knife, of a reciprocating carriage, a roller mounted in the carriage, a cam also mounted in the carriage, connections between the cam and the roller, and means for shifting the position of the cam during the reciprocation of the carriage and thereby shifting the angle at which the roller coöperates with different parts of the knife, substantially as described.

12. In a cutting mechanism, the combination with a cutting-bed having a knife, of a reciprocating carriage, an arm mounted in the carriage, a roller mounted in the arm, a pivoted support to which the arm is pivoted, said support having an extension, a movable cam engaged by the extension and operating to control the position of the pivoted support, and means for shifting the position of the cam and thereby the position of the support at the end of each stroke of the carriage, whereby the roller is caused to coöperate with one part of the knife at one angle during a part of the reciprocation of the carriage, and with another part of the knife at a different angle during the remainder of the reciprocation, substantially as described.

13. In a cutting mechanism, the combination with a cutting-bed having a knife, of a reciprocating carriage, a coöperating cutting device mounted in the carriage, a shifting cam moving with the carriage, means operating to shift the position of the cam during the reciprocation of the carriage, and connections between the coöperating cutting device and the cam whereby the angle of said device to the knife is changed during the reciprocation of the carriage, substantially as described.

14. In a cutting mechanism, the combination with a cutting-bed having a knife, of a reciprocating carriage, a roller mounted in the carriage, a shifting cam also mounted in the carriage, and a stop located along the path of travel of the carriage and operating to shift the position of the cam, and connections between the roller and the cam, substantially as described.

15. The combination with a cutting-bed having a knife, of a carriage reciprocating with respect thereto, an arm carried by the carriage, a pivoted bearing-piece to which the arm is pivoted, an extension from said bearing-piece, a cam-plate with which the extension engages, suitable ways connected to the carriage in which the cam-plate is mounted, stops located along the line of travel of the carriage and operating to shift the position of the cam-plate, and a roller mounted in the arm and coöperating with the knife, the cam-plate operating to hold the roller at one angle to one part of the knife during one stroke of the carriage and at another angle to the rest of the knife during the remainder of the movement of the carriage, substantially as described.

16. The combination with a cutting-bed having a knife, of a carriage reciprocating with respect thereto, a coöperating cutting device mounted in the carriage, mechanism for reciprocating the carriage, a constantly-running mechanism for driving the carriage-reciprocating mechanism, and means for automatically connecting the carriage-reciprocating mechanism to and disconnecting it from the constantly-running mechanism, substantially as described.

17. The combination with a power-shaft, of a wheel constantly driven thereby, a second wheel driven from the first-named wheel, a crank mechanism, means for automatically connecting the crank mechanism to and disconnecting it from the second wheel, a reciprocating carriage driven by the crank mechanism, a cutting-bed carrying a knife, and a coöperating cutting device mounted in the carriage, substantially as described.

18. The combination with a bed, of a suction device coöperating therewith to hold a sheet of material thereagainst, a support, a continuously-operating suction mechanism coöperating with the support, means for producing a relative movement between the bed and the support, and means for cutting off the suction from the bed, substantially as described.

19. The combination with a bed, of a suction device coöperating therewith to hold a sheet of material thereagainst, a support, a continuously-operating suction mechanism coöperating with the support, means for producing a relative positioning movement between the bed and the support, means for producing a relative delivery movement between the bed and the support, and means for cutting off the suction from the bed, substantially as described.

20. The combination with a bed, of a suction device coöperating therewith to hold a sheet of material thereagainst, a support, continuously-operating suction mechanism coöperating with the support, means for moving the support into position over the bed, means for moving the bed to deliver the material to the support, and means for cutting off the suction from the bed, substantially as described.

21. In a cutting mechanism, the combination with a knife of a perforated plate lying inside the knife, suitable means coöperating with the knife to effect the cut, means for removing the perforated plate to deliver the cut material, a suction mechanism coöperating with the perforated plate to hold the material thereon, and means whereby the suction mechanism is retained in operation during the delivery movement of the plate.

22. In a cutting mechanism, the combination with a knife of a perforated plate lying inside the knife, means located outside the knife for holding the material outside the line of cut, suitable means coöperating with the knife to effect the cut, means for moving the perforated plate to deliver the cut material, a suction mechanism coöperating with the perforated plate to hold the material thereon and means whereby said suction mechanism is caused to act during the delivery movement; substantially as described.

23. In a cutting mechanism, the combination with the cutting-bed consisting of two perforated plates one lying within the line of cut and the other outside the line of cut, of a knife interposed between the two plates, means operating in connection with the knife to cut the material, means for moving the plate which is within the line of cut to deliver the cut material, suction mechanism operating in connection with the plates to hold the material thereon, and means whereby said suction mechanism continues to operate during the delivery movement; substantially as described.

24. The combination with a movable arm and means for moving it, of a carrier pivoted thereon, a wrapper-support pivoted in the carrier, means for swinging the carrier upon its pivot, whereby it is given an angular movement with respect to the arm, and means for turning the wrapper-support on its pivot, substantially as described.

25. The combination with a swinging arm and means for swinging it on its pivot, of a carrier pivoted thereon, a wrapper-support pivoted in the carrier, means for swinging the carrier upon its pivot, whereby it is given an angular movement with respect to the arm, and means for turning the wrapper-support on its pivot, substantially as described.

26. The combination with a wrapping mechanism, of a wrapper-support located above the wrapping mechanism, means for securing and holding a wrapper to the support with one end thereof depending from the support, and means for producing a relative movement between the support and the wrapping mechanism as the wrapper is wound on the article to be wrapped, substantially as described.

27. The combination with a wrapping mechanism, of a wrapper-support located above the wrapping mechanism, a suction mechanism for securing and holding a wrapper on the support with one end thereof depending from the support, and means for producing a relative movement between the support and the wrapping mechanism as the wrapper is wound on the article to be wrapped, substantially as described.

28. A wrapper-support embodying a suction-chamber operating to hold part of the wrapper only, and means for creating suction in the chamber, substantially as described.

29. The combination with a wrapping mechanism, of a wrapper-support embodying a suction-chamber which operates to hold a part of the wrapper only, and means for creating suction in said chamber and maintaining it during the wrapping operation, substantially as described.

30. The combination with a wrapper-support embodying two unconnected chambers, of a suction mechanism, substantially as described.

31. The combination with a wrapper-support embodying two unconnected chambers, of a suction mechanism operating in connection with one of the chambers, and a blast mechanism operating in connection with the other chamber, substantially as described.

32. The combination with a wrapping mechanism, of a suction wrapper-support embodying two unconnected chambers, a suction mechanism operating in connection with one of the chambers, and a blast device operating in connection with the other chamber to positively insert part of the wrapper into the wrapping mechanism, substantially as described.

33. The combination with a wrapping mechanism, of a suction wrapper-support embodying two unconnected chambers, means for creating a suction in one of the chambers and maintaining it during the wrapping operation, and a blast device operating in connection with the other chamber to positively insert part of the wrapper into the wrapping mechanism, substantially as described.

34. The combination with a movable pipe, of a suction-support carried thereby and embodying two unconnected chambers, a suction mechanism operating through the pipe to create a suction in one of the chambers, and a blast mechanism located in the path of travel of the support and operating in connection with the other chamber, substantially as described.

35. The combination with a movable pipe, of a suction-support carried thereby and including two unconnected chambers, a suction mechanism operating through the pipe to create a suction in one of the chambers, a pipe connected to the other chamber and having a spring-section, and a blast-pipe located in the path of travel of the suction-support with which the pipe having the spring-section engages, substantially as described.

36. In a cigar-machine, the combination with a wrapping mechanism, of a support moving over the wrapping mechanism, a suction mechanism coacting with the support to hold a wrapper thereon in a stretched condition, means for causing one end of the wrapper to depend from the support into a position where it may be seized by the wrapping mechanism, and means for maintaining the suction during the wrapping operation, substantially as described.

37. The combination with a wrapping mechanism, of a wrapper-support, and retaining devices coacting with the support and operating to hold part of the wrapper thereon, another part of the wrapper being free to be seized by the wrapping mechanism, the wrapper being drawn from the wrapper-support by the wrapping mechanism against the force of the retaining devices, substantially as described.

38. The combination with a wrapping mechanism, of a wrapper-support, a suction mechanism coacting with the support and operating to hold a part of a wrapper thereon, another part of the wrapper being free to be seized by the wrapping mechanism, and means for maintaining the suction on the wrapper during the wrapping operation, substantially as described.

39. The combination with a wrapping mechanism, of a movable arm, a carrier pivoted in the arm, a support pivoted in the carrier, a suction mechanism coacting with the support, means for moving the arm toward the wrapping mechanism, and means for turning the support on its pivot and the carrier on its pivot as the wrapper is delivered to the wrapping mechanism, substantially as described.

40. The combination with a wrapping mechanism, of an arm swinging about a center, a carrier pivoted in the arm, a wrapper-support pivoted in the carrier, a suction-pipe connected to the wrapper-support and moving therewith, means for swinging the arm toward the wrapping mechanism, a suction-pipe, a telescopic connection between said pipe and the pipe leading to the support, means for swinging the arm on its pivot and for swinging the carrier on its pivot and the support on its pivot as the wrapper is delivered to the wrapping mechanism, substantially as described.

41. The combination with a swinging arm, of a carrier pivoted in said arm, a cam-operated arm to which said carrier is connected, a support pivoted in the carrier, a cam-operated arm to which said support is connected, a suction mechanism coacting with the support and operating to hold a wrapper thereagainst, and means for operating the swinging arm and simultaneously causing the cam-operated arms to swing the carrier and the support, substantially as described.

42. The combination with a pivoted arm, of a carrier pivoted therein, said carrier having an extension, a support pivoted in the carrier, said support having an arm connected thereto, a suction mechanism coacting with the support and operating to hold a wrapper thereagainst, a slotted cam-plate, arms on the pivoted arm and operated by the slotted cam-plate, and connections between one of said arms and the extension and the other of said arms and the arm extending from the support, substantially as described.

43. The combination with a wrapping mechanism, of a movable arm, a carrier movably mounted thereon, a wrapper-support mounted in the carrier, means for moving the arm, means for moving the carrier with respect to the arm as the wrapper is delivered to the wrapping mechanism, and means for moving the support, whereby a wrapper is fed to the wrapping mechanism, substantially as described.

44. The combination with a wrapping mechanism, of a movable arm, a carrier movably mounted thereon, a wrapper-support mounted in the carrier, suitable cams, and means whereby said cams are caused to move the carrier with respect to the arm as the wrapper is delivered to the wrapping mechanism and move the support with respect to the carrier, substantially as described.

45. The combination with a wrapping mechanism, of a suction wrapper-support, pasting devices located below the path of traverse of the wrapper and support, and means for moving the support whereby the wrapper is brought into contact with the pasting device during the movement of the support and as the paste is applied thereto.

46. The combination with a wrapping mechanism, of a wrapper-support, means for supplying wrappers thereto, means for producing a relative approaching movement between the wrapper-support and the wrapping mechanism, and means for producing a relative angular movement between the support and the wrapping mechanism as the wrapper is delivered, substantially as described.

47. The combination with a wrapping mechanism, of a suction wrapper-support, means for supplying wrappers thereto, means for producing a relative approaching movement between the wrapper-support and the wrapping mechanism, and means for producing a relative angular movement between the support and the wrapping mechanism as the wrapper is delivered, substantially as described.

48. The combination with a wrapping mechanism, of a wrapper-support, means for supplying wrappers thereto, means for producing a relative approaching movement and a relative traversing movement between the support and the wrapping mechanism as the wrapper is delivered, substantially as described.

49. The combination with a wrapping mechanism, of a suction wrapper-support, means for supplying wrappers thereto, and means for producing a relative approaching movement and a relative traversing movement between the support and the wrapping mechanism as a wrapper is delivered, substantially as described.

50. The combination with a wrapping mechanism, of a wrapper-support, means for supplying wrappers thereto, and means for producing a movement between the support and the wrapping mechanism as a wrapper is delivered which is the resultant of an approaching movement, a traversing movement and an angular movement, substantially as described.

51. The combination with a wrapping mechanism, of a suction wrapper-support, means for supplying wrappers thereto, and means for producing a movement between the support and the wrapping mechanism as a wrapper is delivered which is the resultant of an approaching movement, a traversing movement and an angular movement, substantially as described.

52. The combination with a wrapping mechanism, of a suction wrapper-support, means for supplying wrappers thereto, and means for giving the wrapper-support an approaching movement and an angular movement with respect to the wrapping mechanism as it delivers a wrapper thereto, substantially as described.

53. The combination with a wrapping mechanism, of a suction wrapper-support, means for supplying wrappers thereto, and means for giving the wrapper-support an approaching movement and a traversing movement with respect to the wrapping mechanism as wrapped cigar from the wrapping mechanism to one set of retaining devices, means for rotating the holder, and means for again opening the retaining devices to permit the bunch to be delivered to the wrapping mechanism, substantially as described.

67. The combination with a wrapping mechanism, of a bunch-receptacle, a bunch-holder having two sets of retaining devices thereon, means located near the bunch-receptacle for opening the retaining devices to receive a bunch therefrom, means for moving the holder from the bunch-receptacle to the wrapping mechanism, means located near the wrapping mechanism for opening the retaining devices, means for transferring a wrapped cigar from the wrapping mechanism to the retaining devices, and means for operating the holder so as to deliver the bunch held by the other set of retaining devices to the wrapping mechanism, substantially as described.

68. The combination with a wrapping mechanism, of a bunch-receptacle, a rotating bunch-holder having two sets of bunch-retaining devices, means for moving the holder from the bunch-receptacle to the wrapping mechanism, means located near the bunch-receptacle for opening the retaining devices so that one set may receive a bunch, means located near the wrapping mechanism for opening the retaining devices, means for transferring a cigar from the wrapping mechanism to one set of retaining devices, means for rotating the bunch-holder so as to bring the other set of retaining devices into delivery position, and means for opening the retaining devices to deliver the bunch to the wrapping mechanism, substantially as described.

69. The combination with a shaft, of means for swinging said shaft about a center, a bunch-holder mounted on the shaft, and means for rotating the shaft to reverse the position of the bunch-holder, substantially as described.

70. The combination with a shaft, of a pair of sleeves thereon, retaining devices carried by the sleeves, means for rotating the sleeves on the shaft in order to open and close the retaining devices, means for swinging the shaft about a center, and means for rotating the shaft and the sleeves, substantially as described.

71. In a bunch-holder, the combination with a pair of rotatable sleeves, having suitable retaining devices, of means for rotating the sleeves with relation to each other to open and close the retaining devices, substantially as described.

72. The combination with a wrapping mechanism, of a pair of rotatable sleeves having bunch-retaining devices, means for rotating the sleeves to open and close the bunch-retaining devices, and means for moving the sleeves into delivery position with respect to the wrapping mechanism, substantially as described.

73. The combination with a wrapping mechanism, of a pair of sleeves, bunch-retaining devices mounted on the sleeves, means for rotating the sleeves with respect to each other to open and close the retaining devices, means for moving the sleeves into position near the wrapping mechanism, and means for rotating the sleeves, substantially as described.

74. In a bunch-holder, the combination with a support, of bunch-retaining devices carried thereby, means for opening and closing the retaining devices, and an intermediate centering device mounted on the support and located between the retaining devices, substantially as described.

75. In a bunch-holder, the combination with a support, of a pair of sleeves, bunch-retaining devices carried by the sleeves, means for moving the sleeves to open and close the retaining devices, and an intermediate centering-yoke mounted on the support and located between the retaining devices, substantially as described.

76. In a bunch-holder, the combination with a support, of a pair of superposed rotatable slotted sleeves mounted thereon, bunch-retaining devices carried by the sleeves, and an intermediate centering-yoke, the stem of which passes through the slots and into the support, whereby said centering-yoke not only serves as a centering device but also limits the movement of the sleeves, substantially as described.

77. In a bunch-holder, the combination with an internal support, of a pair of rotatable sleeves mounted thereon, bunch-retaining devices carried by the sleeves, a pin connected to each of the sleeves, whereby the sleeves may be rotated to open the retaining devices by separating the pins, substantially as described.

78. The combination with an arm, of means for turning it about a center, a shaft journaled in ears on said arm, a pinion on the shaft, a rack for moving the pinion, a pair of rotatable sleeves mounted on the shaft, bunch-retaining devices mounted on the sleeves, and means for rotating the sleeves to open and close the bunch-retaining devices, substantially as described.

79. The combination with a hub having a central perforation, of an arm connected thereto, a shaft journaled in ears in the arm, a pinion on the shaft, a rack-rod moving through the central perforation of the hub and engaging the pinion, a pair of rotating sleeves mounted on the shaft, bunch-retaining devices carried by the sleeves, means for rotating the sleeves to open and close the bunch-retaining devices, and means for reciprocating the rack-rod, substantially as described.

80. The combination with a movable bunch-holder having projections, of means by which said projections are opened and closed, a lever in the path of the opening means, and it delivers a wrapper thereto, substantially as described.

54. The combination with a wrapping mechanism, of a suction wrapper-support, means for supplying wrappers thereto, and means for giving the wrapper-support a movement with respect to the wrapping mechanism as it delivers a wrapper thereto which is the resultant of an approaching movement, a traversing movement and an angular movement, substantially as described.

55. The combination with a cutting-bed, of a wrapping mechanism, a wrapper-support operating to take a wrapper from the cutting-bed and deliver it to the wrapping mechanism, and means for retaining the wrapper on the support, said retaining means operating on a part of the wrapper after another part has been delivered to the wrapping mechanism, whereby the wrapper is wound under tension on the article to be wrapped, substantially as described.

56. The combination with a cutting-bed, of a wrapping mechanism, a wrapper-support operating to take a wrapper from the cutting-bed and deliver it to the wrapping mechanism, a suction mechanism for retaining the wrapper on the support, and means for maintaining the suction during the wrapping operation, substantially as described.

57. The combination with a cutting-bed, of a wrapping mechanism, a wrapper-support for taking the wrapper from the cutting-bed and delivering it to the wrapping mechanism, a suction mechanism operating to hold a part of the wrapper on the support, the remainder of the wrapper being free to be seized by the wrapping mechanism, and means for maintaining the suction during the wrapping operation, substantially as described.

58. The combination with a wrapping mechanism, of a bunch-holder, means for moving the holder into position over the wrapping mechanism, and means for reversing the holder to deliver a bunch to the wrapping mechanism, substantially as described.

59. The combination with a wrapping mechanism, of a bunch-holder having two sets of retaining devices, means for producing a relative movement between the wrapping mechanism and the bunch-holder whereby the two are positioned so that the bunch can be delivered to the wrapping mechanism, means whereby the cigar is transferred from the wrapping mechanism to one set of retaining devices, and means whereby the bunch is transferred from the other set of retaining devices to the wrapping mechanism, substantially as described.

60. The combination with a wrapping mechanism, of a bunch-holder having two sets of retaining devices, means for moving the bunch-holder into position over the wrapping mechanism, means for transferring the wrapped cigar from the wrapping mechanism to one set of retaining devices, and means for delivering a bunch to the wrapping mechanism from the other set of retaining devices, substantially as described.

61. The combination with a wrapping mechanism, of a rotating bunch-holder having two sets of retaining devices, means for producing a relative movement between the wrapping mechanism and the holder, whereby the two are positioned so that a bunch may be delivered from the holder to the wrapping mechanism, means whereby a wrapped cigar is transferred from the wrapping mechanism to one set of retaining devices, and means whereby a bunch is delivered from the other set of retaining devices to the wrapping mechanism, substantially as described.

62. The combination with a wrapping mechanism, of a rotating bunch-holder having two sets of retaining devices, means for moving the holder into delivery position with respect to the wrapping mechanism, means for transferring a wrapped cigar from the wrapping mechanism to one set of retaining devices, and means for rotating the holder and depositing a bunch in the wrapping mechanism from the other set of retaining devices, substantially as described.

63. The combination with a wrapping mechanism, of a rotating bunch-holder having two sets of retaining devices, means for moving the holder into delivery position with respect to the wrapping mechanism, means for operating the retaining devices, means for transferring a cigar from the wrapping mechanism into one set of retaining devices, means for rotating the bunch-holder, and means for again opening the retaining devices to deposit a bunch in the wrapping mechanism, substantially as described.

64. The combination with a wrapping mechanism, of a bunch-receptacle, a bunch-holder moving between the wrapping mechanism and the receptacle, means operated by the movement of the holder for causing the bunch-receptacle to deliver a bunch to the holder, and means for operating the holder to deliver the bunch from the holder to the wrapping mechanism, substantially as described.

65. The combination with a wrapping mechanism, of a bunch-receptacle, a bunch-holder having two sets of retaining devices, means for delivering a bunch from the bunch-receptacle into one set of retaining devices, means for moving the holder from the bunch-receptacle into delivery position with respect to the wrapping mechanism, means for transferring a wrapped cigar from the wrapping mechanism to the other set of retaining devices, and means for operating the holder so as to deliver the bunch to the wrapping mechanism, substantially as described.

66. The combination with a wrapping mechanism, of a bunch-receptacle, a rotating bunch-holder having an upper and lower set of retaining devices, means for moving the holder from the bunch-receptacle to the wrapping mechanism, means for opening the retaining devices, means for transferring a means for rocking the lever so as to cause it to engage between and separate the opening means, substantially as described.

81. The combination with a wrapping mechanism, of an opening and closing device by which the wrapped cigars are taken, means for opening said device, and a displacing mechanism for transferring the cigars from the wrapping mechanism to the device, substantially as described.

82. The combination with a wrapping mechanism, of a holder having retaining devices thereon, means for rotating the holder, means for opening and closing the retaining devices on the holder, and displacing mechanism for transferring the cigars from the wrapping mechanism into the retaining devices, substantially as described.

83. The combination with a wrapping mechanism, of a holder having opening and closing retaining devices thereon, a shaft located near the wrapping mechanism, devices for opening and closing the retaining devices, displacing-arms secured on the shaft, and means mounted on the shaft for operating the opening and closing devices and also for rocking the shaft carrying the displacing-arms, substantially as described.

84. The combination with a wrapping mechanism, of a holder having a plurality of sets of opening and closing retainers, a shaft, displacing means operated by the shaft, devices for opening and closing the retainers, means for operating said opening and closing devices, means for operating the holder to bring different sets of retainers into operative position, and means carried by the shaft constructed to operate the displacing means and the opening and closing devices simultaneously and to operate the opening and closing devices without operating the displacing means, substantially as described.

85. The combination with a wrapping mechanism, of a bunch-holder having a plurality of bunch-retainers thereon, means for operating the holder so as to open one set of retainers, displacing-arms operating in connection with the wrapping mechanism to place a cigar in one set of retainers, means for operating the holder so as to bring another set of retainers in position, and means for opening said retainers, substantially as described.

86. The combination with a bunch-holder having a plurality of sets of retainers thereon and movable to present said sets to the wrapping mechanism, of an opening device, a cam for operating said device, displacing means, and means whereby the cam and displacing means may be operated together, said means being also constructed to operate said devices separately, substantially as described.

87. The combination with a wrapping mechanism, of a bunch-holder having a plurality of sets of retainers thereon, means for opening and closing the retainers, a shaft, displacing-arms carried by the shaft, means also carried by the shaft for operating the opening and closing means, a swinging lever mounted on the shaft, means carried by the lever for operating both the shaft and the operating means, and means for giving said swinging lever different amounts of movement, whereby on one stroke it will operate both the operating means and the displacing means and on the other stroke will operate only the operating means, substantially as described.

88. The combination with a wrapping mechanism, of a bunch-holder having two sets of retainers, means for operating the holder so as to present first one set of retainers to the wrapping mechanism and then the other set, a lever for opening the retainers, a shaft, displacing-arms secured thereto, a cam on the shaft for operating the opening-lever, said cam having a notched collar, a pawl-carrying lever mounted on the shaft and carrying a pawl which engages the collar, a stop for operating the pawl of the pawl-carrying lever, and means for giving the pawl-carrying lever different amounts of throw, substantially as described.

89. The combination with a wrapping mechanism, of a bunch-holder having retainers for both a completed cigar and a bunch, means for producing a relative movement between the bunch-holder and the wrapping mechanism and means whereby the holder is caused to deliver a bunch to the wrapping mechanism and to receive a wrapped cigar therefrom, substantially as described.

90. The combination with a wrapping mechanism, of a bunch-holder having retainers for both a completed cigar and a bunch, means for moving the bunch-holder between the wrapping mechanism and the delivery-point, means whereby the holder receives a completed cigar from the wrapping mechanism and delivers a bunch thereto, and means whereby the holder delivers the completed cigar at the delivery-point, substantially as described.

91. The combination with a wrapping mechanism, of a bunch-holder having retainers for both a bunch and a completed cigar, means for moving the bunch-carrier into position to receive the completed cigar, means for operating it to deliver the bunch to the wrapping mechanism, and means for moving it away from the wrapping mechanism, substantially as described.

92. The combination with a wrapping mechanism, of a bunch-carrier having opening and closing retainers, means for operating said retainers, starting and stopping mechanism for the wrapping mechanism, a power-driven mechanism, and means whereby said mechanism operates both the starting and stopping mechanism for the wrapping mechanism and the operating means for the retainers, substantially as described.

93. The combination with a wrapping mechanism having starting and stopping devices, of a bunch-holder having opening and closing retainers, means for producing a relative movement between the holder and the wrapping mechanism, a shaft, an arm on the shaft for operating the opening and closing retainers, a cam on the shaft for operating the starting and stopping devices, and means for operating the shaft, substantially as described.

94. The combination with a wrapping mechanism having starting and stopping devices, of a bunch-holder having opening and closing retainers, means for moving the holder into a position near the wrapping mechanism, a shaft, an arm on the shaft for operating the opening and closing retainers, a cam on the shaft for operating the starting and stopping devices, and means for operating the shaft, substantially as described.

95. The combination with a wrapping mechanism, of starting and stopping devices therefor, a bunch-holder having opening and closing retainers, means for operating said retainers, and means for successively operating the opening and closing devices for the retainers and the starting and stopping devices for the wrapping mechanism, substantially as described.

96. In a cigar-machine, the combination with a wrapping mechanism, of a cutting-bed, means coöperating therewith to cut a wrapper, means for transferring the wrapper from the cutting-bed to the wrapping mechanism, a bunch-holder, means for moving the bunch-holder toward and away from the wrapping mechanism, means for operating the bunch-holder so as to cause it both to receive a completed cigar from the wrapping mechanism and to deliver a bunch to the wrapping mechanism, devices for transferring the completed cigar from the wrapping mechanism to the bunch-holder, means for starting and stopping the wrapping mechanism, a constantly-driven power-shaft, and connections from the power-shaft to the several mechanisms whereby the same are operated, substantially as described.

97. In a cigar-machine, the combination with a wrapping mechanism, of a wrapper-support, means for delivering a wrapper to said support, means for retaining the wrapper on the support, means for producing a relative movement between the wrapping mechanism and the support so as to enable the support to deliver the wrapper to the wrapping mechanism, starting and stopping mechanism for the wrapping mechanism, a bunch-holder, means whereby the bunch-holder is caused to receive a completed cigar from the wrapping mechanism and to deliver a bunch to it, and operating devices, substantially as described.

98. In a cigar-machine, the combination with a suction cutting-bed having a movable section, a suction-support, means whereby the suction-support is caused to take a wrapper from the cutting-bed, a wrapping mechanism, means producing a relative movement between the support and the wrapping mechanism so as to enable the support to deliver the wrapper to the wrapping mechanism, a bunch-holder having retaining devices for a bunch and a completed cigar, and suitable operating mechanism, substantially as described.

99. In a cigar-machine, the combination with a suction cutting-bed having a movable section, of a suction-support, means for constantly maintaining suction in the support, means whereby the suction-support is caused to take the wrapper from the cutting-bed, a wrapping mechanism, means for producing a relative movement between the support and the wrapping mechanism so as to enable the support to deliver the wrapper to the wrapping mechanism, a bunch-holder having retaining devices for a bunch and a completed cigar, and suitable operating mechanism, substantially as described.

In testimony whereof I have hereunto set my hand in the presence of two subscribing witnesses.

OLUF TYBERG.

Witnesses:
A. L. KENT,
A. A. V. BOURKE.